US012688227B2

(12) United States Patent
Maheshwari et al.

(10) Patent No.: US 12,688,227 B2
(45) Date of Patent: Jul. 21, 2026

(54) AUTOMATIC GENERATION OF PRESENTATIONS FROM DOCUMENTS

(71) Applicant: ADOBE INC., San Jose, CA (US)

(72) Inventors: Himanshu Maheshwari, Bengaluru (IN); Aparna Garimella, Bengaluru (IN); Niyati Himanshu Chhaya, Bangalore (IN)

(73) Assignee: ADOBE INC., San Jose, CA (US)

( * ) Notice: Subject to any disclaimer, the term of this patent is extended or adjusted under 35 U.S.C. 154(b) by 259 days.

(21) Appl. No.: 18/403,808

(22) Filed: Jan. 4, 2024

(65) Prior Publication Data

US 2025/0225173 A1 Jul. 10, 2025

(51) Int. Cl.
| | |
|---|---|
| *G06F 17/00* | (2019.01) |
| *G06F 16/438* | (2019.01) |
| *G06F 40/30* | (2020.01) |
| *G06F 40/40* | (2020.01) |

(52) U.S. Cl.
CPC .......... *G06F 16/4393* (2019.01); *G06F 40/30* (2020.01); *G06F 40/40* (2020.01)

(58) Field of Classification Search
USPC .......................................................... 704/9
See application file for complete search history.

(56) References Cited

U.S. PATENT DOCUMENTS

| | | | | |
|---|---|---|---|---|
| 10,222,942 | B1 * | 3/2019 | Zeiler ....................... | G06N 5/04 |
| 11,748,577 | B1 * | 9/2023 | Aberle ................... | G06N 20/00 |
| | | | | 704/9 |

| | | | | |
|---|---|---|---|---|
| 2018/0232340 | A1 * | 8/2018 | Lee ........................ | G06F 40/186 |
| 2019/0095803 | A1 * | 3/2019 | Raskovic .............. | G06F 40/131 |
| 2021/0279269 | A1 * | 9/2021 | Verma ............... | G06F 16/24578 |
| 2022/0092097 | A1 * | 3/2022 | Gupta ....................... | G06N 3/09 |
| 2023/0343126 | A1 * | 10/2023 | Salacinski .......... | G06V 30/1448 |
| 2023/0351102 | A1 * | 11/2023 | Tran ..................... | G06N 3/0895 |
| 2024/0013562 | A1 * | 1/2024 | Montero ............... | G06V 10/82 |

(Continued)

OTHER PUBLICATIONS

Tsu-Jui Fu, William Yang Wang, Daniel McDuff, Yale Song2, "DOC2PPT: Automatic Presentation Slides Generation from Scientific Documents", UC Santa Barbara Microsoft Research, The Thirty-Sixth AAAI Conference on Artificial Intelligence (AAAI-22), Jun. 28, 2022 (Year: 2022).*

(Continued)

*Primary Examiner* — Satwant K Singh

(74) *Attorney, Agent, or Firm* — F. CHAU & ASSOCIATES, LLC

(57) ABSTRACT

Embodiments of the present disclosure include extracting structured text from a source document. The structured text comprises a plurality of source sections. Some embodiments generate a semantic outline based on the structured text. In some examples, the semantic outline comprises a plurality of output headings. Some embodiments generate text content corresponding to each of the plurality of output headings. An image is selected from the source document for each of the plurality of output headings by computing a similarity score between the image and the text content. Then, an output document is generated based on the semantic outline, where the output document comprises a plurality of output sections corresponding to the plurality of output headings, respectively.

19 Claims, 19 Drawing Sheets

(56) References Cited

U.S. PATENT DOCUMENTS

2024/0062019 A1* 2/2024 Aberle .................... G06F 40/40

OTHER PUBLICATIONS

"Introducing ChatGPT", Oct. 2023, found on the internet at https://openai.com/blog/chatgpt, 14 pages.

Masum, et al., "A Multi-Agent System for Building Automatic Multi-Modal Presentation of a Topic from World Wide Web Information", In IEEE/WIC/ACM International Conference on Intelligent Agent Technology, (Sep. 2005), 4 pages.

Winters, et al., "Automatically Generating Engaging Presentation Slide Decks", In International Conference on Computational Intelligence in Music, Sound, Art and Design, (Apr. 2019), https://doi.org/10.1007/978-3-030-16667-0_9, 15 pages.

Hu, et al., "PPSGen: Learning-Based Presentation Slides Generation for Academic Papers", in IEEE transactions on knowledge and data engineering, vol. 27, No. 4, Apr. 2015, pp. 1085-1097.

Bhandare, et al., "Automatic Era: Presentation slides from Academic Paper", In 2016 International Conference on Automatic Control and Dynamic Optimization Techniques (ICACDOT), (Sep. 2016), pp. 809-814.

Syamili, et al., "Presentation Slides Generation from Scientific papers using Support Vector Regression", In International Conference on Inventive Communication and Computational Technologies (ICICCT 2017), (Mar. 2017), pp. 286-291.

Sefid, edt al., "Automatic Slide Generation for Scientific Papers", In Third International Workshop on Capturing Scientific Knowledge co-located with the 10th International Conference on Knowledge Capture, Nov. 2019, found on the internet at CEUR-WS.org/vol-2526/paper2.pdf, (Nov. 2019), 6 pages.

Wang, et al., "Phrase-Based Presentation Slides Generation for Academic Papers", In Proceedings of the Thirty-First AAAI Conference on Artificial Intelligence, vol. 31, No. 1, Feb. 2017, pp. 196-202.

Sun, et al., "D2S: Document-to-Slide Generation Via Query-Based Text Summarization", arXiv preprint arXiv:2105.03664v1 [cs.CL] May 8, 2021, 14 pages.

"python-pptx 0.6.22", Oct. 2023, found on the internet at https://pypi.org/project/python-pptx/, 9 pages.

"SlidesAI.io—Create Slides with AI", Oct. 2023, found on the internet at https://workspace.google.com/marketplace/app/slidesaiio_create_slides_with_ai/904276957168, 1 page.

* cited by examiner

Output Document

Source
Document

Provide a source document 205

Extract content from the source document 210

Generate an output document based on the extraction 215

Present the output document 220

200

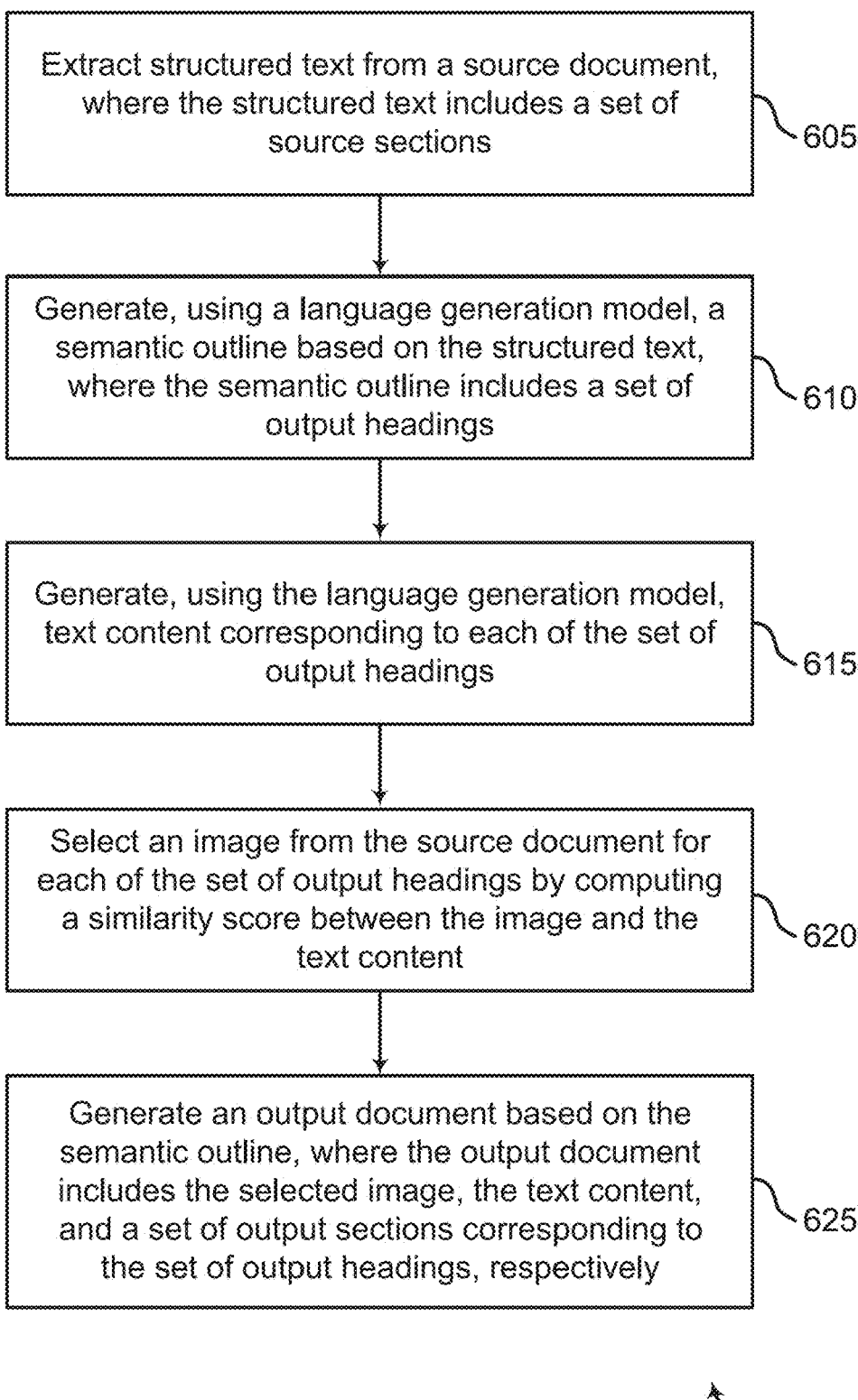

Extract structured text from a source document, where the structured text includes a set of source sections ⟍605

Generate, using a language generation model, a semantic outline based on the structured text, where the semantic outline includes a set of output headings ⟍610

Generate, using the language generation model, text content corresponding to each of the set of output headings ⟍615

Select an image from the source document for each of the set of output headings by computing a similarity score between the image and the text content ⟍620

Generate an output document based on the semantic outline, where the output document includes the selected image, the text content, and a set of output sections corresponding to the set of output headings, respectively ⟍625

The Science of Earthquakes

~1005

By Earthquake Hazards Program

Originally written by Lisa Wald (U.S. Geological Survey) for "The Green Frog News"

What is an earthquake?
~1010

1015

1020

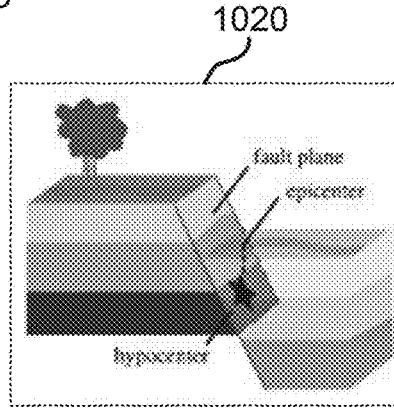

An earthquake is what happens when two blocks of the earth suddenly slip past one another. The surface where they slip is called the fault or fault plane. The location below the earth's surface where the earthquake starts is called the hypocenter, and the location directly above it on the surface of the earth is called the epicenter.

Sometimes an earthquake has foreshocks. These are smaller earthquakes that happen in the same place as the larger earthquake that follows. Scientists can't tell that an earthquake is a foreshock until the larger earthquake happens. The largest, main earthquake is called the mainshock. Mainshocks always have aftershocks that follow. These are smaller earthquakes that occur afterwards in the same place as the mainshock. Depending on the size of the mainshock, aftershocks can continue for weeks, months, and even years after the mainshock!

Sources/Usage: Public Domain.

A normal dip-slip fault is an inclined fracture where the rock mass above an inclined fault moves down (Public domain).

What causes earthquakes and where do they happen?
~1025

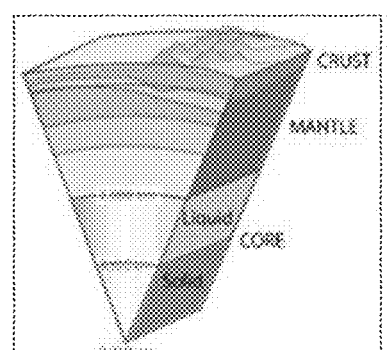

The earth has four major layers: the inner core, outer core, mantle and crust. The crust and the top of the mantle make up a thin skin on the surface of our planet.

But this skin is not all in one piece — it is made up of many pieces like a puzzle covering the surface of the earth. Not only that, but these puzzle pieces keep slowly moving around, sliding past one another and bumping into each other. We call these puzzle pieces tectonic plates, and the edges of the plates are called the plate boundaries. The plate boundaries are made up of many faults, and most of the earthquakes around the world occur on these faults. Since the edges of the plates are rough, they get stuck while the rest of the plate keeps moving. Finally, when the plate has moved far enough, the edges unstick on one of the faults and there is an earthquake.

Figure 11:
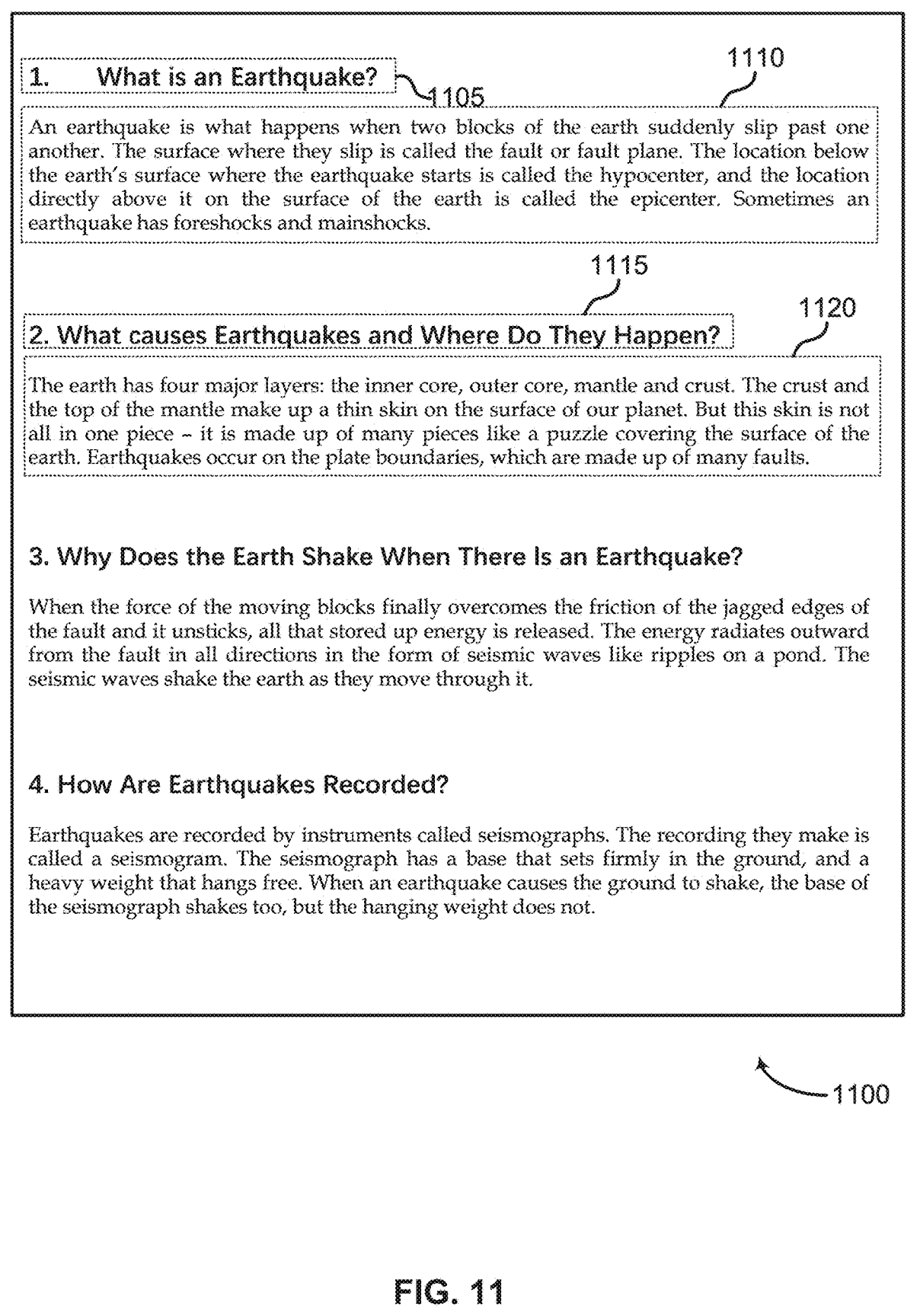

1.  What is an Earthquake? 1105 1110

An earthquake is what happens when two blocks of the earth suddenly slip past one another. The surface where they slip is called the fault or fault plane. The location below the earth's surface where the earthquake starts is called the hypocenter, and the location directly above it on the surface of the earth is called the epicenter. Sometimes an earthquake has foreshocks and mainshocks.

1115

2. What causes Earthquakes and Where Do They Happen? 1120

The earth has four major layers: the inner core, outer core, mantle and crust. The crust and the top of the mantle make up a thin skin on the surface of our planet. But this skin is not all in one piece – it is made up of many pieces like a puzzle covering the surface of the earth. Earthquakes occur on the plate boundaries, which are made up of many faults.

3. Why Does the Earth Shake When There Is an Earthquake?

When the force of the moving blocks finally overcomes the friction of the jagged edges of the fault and it unsticks, all that stored up energy is released. The energy radiates outward from the fault in all directions in the form of seismic waves like ripples on a pond. The seismic waves shake the earth as they move through it.

4. How Are Earthquakes Recorded?

Earthquakes are recorded by instruments called seismographs. The recording they make is called a seismogram. The seismograph has a base that sets firmly in the ground, and a heavy weight that hangs free. When an earthquake causes the ground to shake, the base of the seismograph shakes too, but the hanging weight does not.

Figure 13:
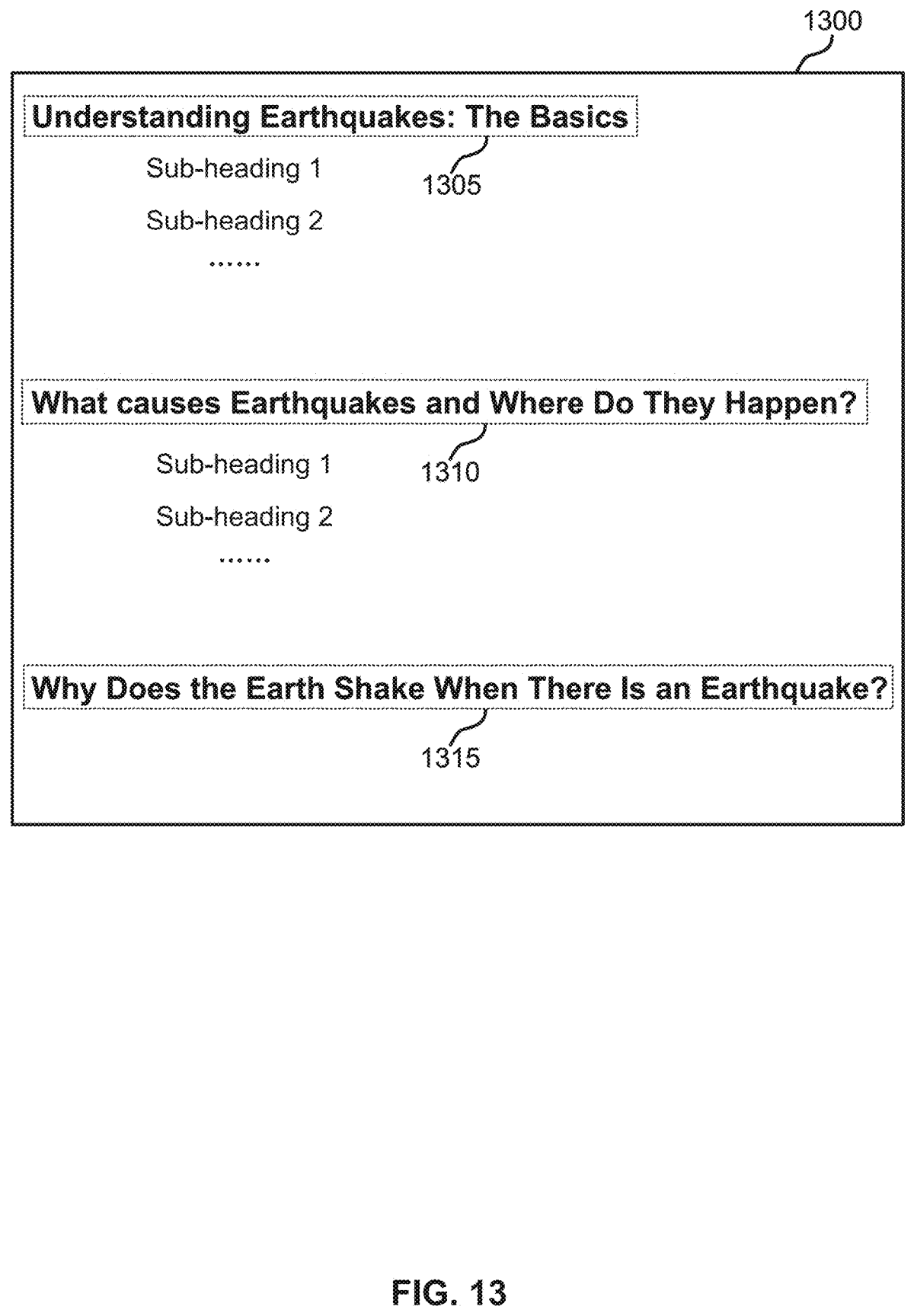

Understanding Earthquakes: The Basics

Sub-heading 1      1305

Sub-heading 2

......

What causes Earthquakes and Where Do They Happen?

Sub-heading 1      1310

Sub-heading 2

......

Why Does the Earth Shake When There Is an Earthquake?

Figure 19:
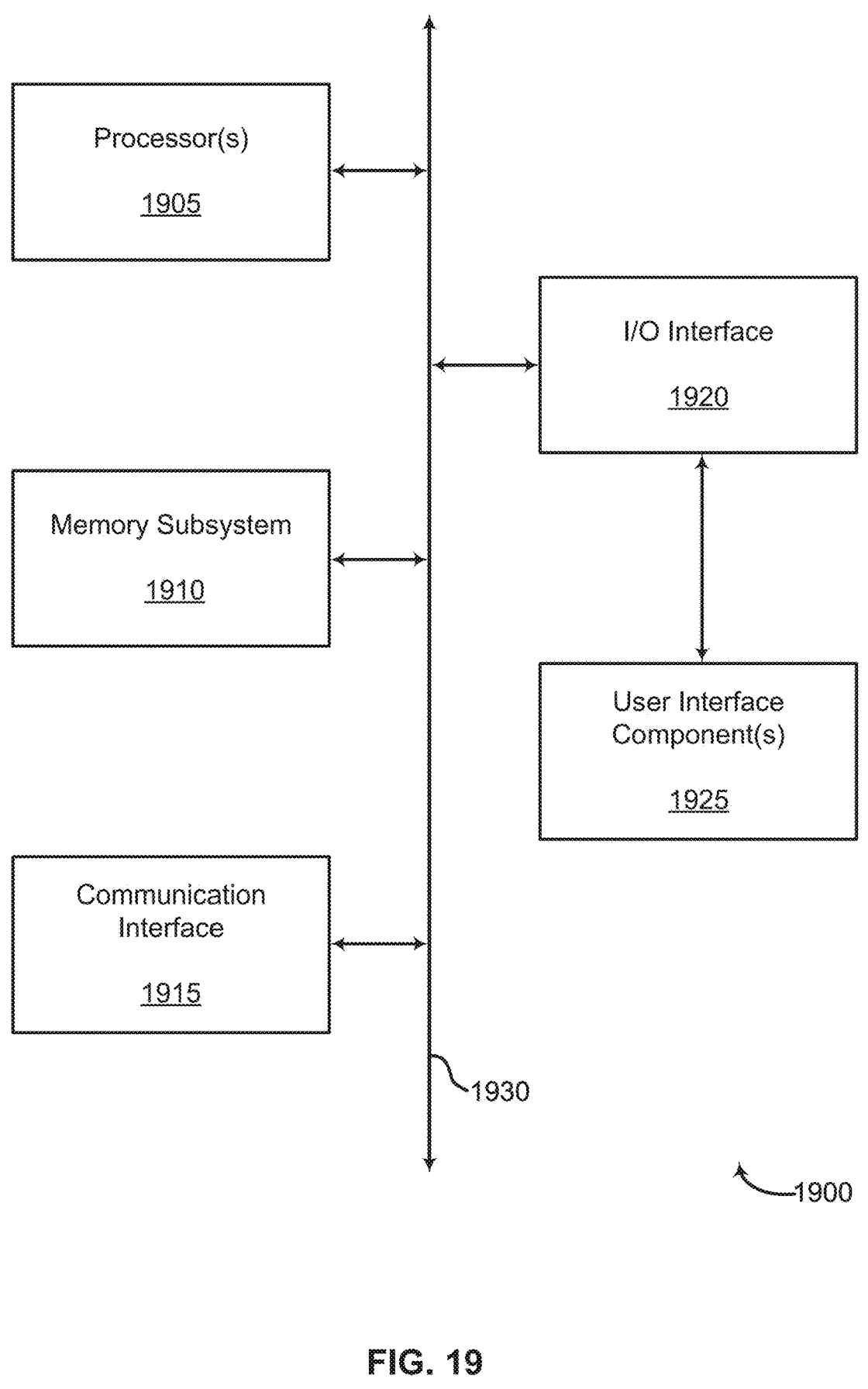

Processor(s)

1905

Memory Subsystem

1910

Communication
Interface

1915

I/O Interface

1920

User Interface
Component(s)

AUTOMATIC GENERATION OF PRESENTATIONS FROM DOCUMENTS

BACKGROUND

The following relates generally to natural language processing (NLP), and more specifically to document summarization using machine learning. Natural language processing refers to techniques for using computers to interpret or generate natural language. In some cases, NLP tasks involve assigning annotation data such as grammatical information to words or phrases within a natural language expression. Different classes of machine-learning algorithms have been applied to NLP tasks. In some examples, generative pre-trained transformer (GPT) models are trained to understand natural language and code. GPT models provide text outputs in response to their inputs (e.g., a prompt from a user).

Document summarization refers to techniques and processes of generating summary documents based on source documents where the summary documents capture the main idea and key points addressed in the source documents. In some examples, presentations such as PowerPoint slides decks are effective ways to communicate in business operations, academic conferences, etc. In some cases, slides decks for presentation are more concise, appealing, and interactive compared to long source documents.

SUMMARY

The present disclosure describes systems and methods for natural language processing. Embodiments of the present disclosure include a document processing apparatus configured to generate an output document (e.g., slides deck) based on a semantic outline of a source document. The semantic outline is generated, via a language generation model, based on a predetermined number of output headings in the output document. For example, the semantic outline comprises a set of output headings and the semantic outline covers important sections of a set of source sections. The language generation model generates text content corresponding to each of the output headings. The output document, e.g., a multi-modal presentation document, includes a set of output sections corresponding to the set of output headings, respectively. For example, the output headings are displayed as titles of presentation slides while content of the output sections are displayed as bullet points following the titles in the presentation slides.

A method, apparatus, and non-transitory computer readable medium for natural language processing are described. One or more embodiments of the method, apparatus, and non-transitory computer readable medium include extracting structured text from a source document, wherein the structured text comprises a plurality of source sections; generating, using a language generation model, a semantic outline based on the structured text, wherein the semantic outline comprises a plurality of output headings; generating, using the language generation model, text content corresponding to each of the plurality of output headings; selecting an image from the source document for each of the plurality of output headings by computing a similarity score between the image and the text content; and generating an output document based on the semantic outline, wherein the output document comprises the selected image, the text content, and a plurality of output sections corresponding to the plurality of output headings, respectively.

An apparatus and method for natural language processing are described. One or more embodiments of the apparatus and method include at least one processor; at least one memory including instructions executable by the at least one processor; an extraction component comprising parameters stored in the at least one memory and configured to extract structured text from a source document, wherein the structured text comprises a plurality of source sections; a language generation model comprising parameters stored in the at least one memory and configured to generate a semantic outline based on the structured text, wherein the semantic outline comprises a plurality of output headings; and a document generator comprising parameters stored in the at least one memory and configured to generate an output document based on the semantic outline, wherein the output document comprises a plurality of output sections corresponding to the plurality of output headings, respectively.

BRIEF DESCRIPTION OF THE DRAWINGS

FIG. 6 shows an example of a method for natural language processing according to aspects of the present disclosure.

FIG. 10 shows an example of a source document according to aspects of the present disclosure.

FIG. 11 shows an example of model input to a transformer network according to aspects of the present disclosure.

FIG. 13 shows an example of a semantic outline according to aspects of the present disclosure.

FIG. 19 shows an example of a computing device according to aspects of the present disclosure.

DETAILED DESCRIPTION

Figure 1:
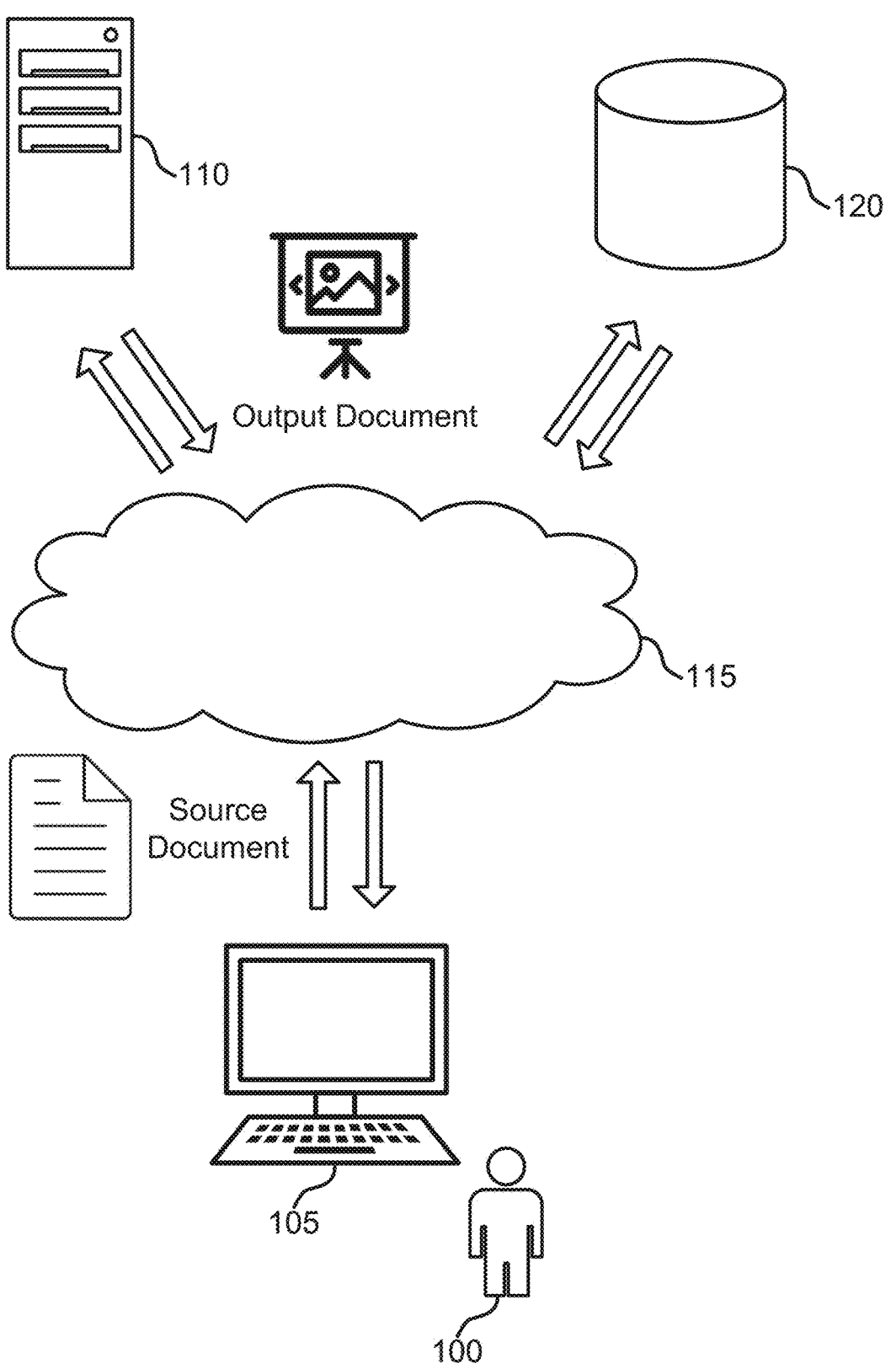
FIG. 1 shows an example of a document processing system according to aspects of the present disclosure.

The present disclosure describes systems and methods for natural language processing. Embodiments of the present disclosure include a document processing apparatus configured to generate an output document (e.g., slides deck) based on a semantic outline of a source document. The semantic outline is generated, via a language generation model, based on a predetermined number of output headings in the output document. For example, the semantic outline comprises a set of output headings and the semantic outline covers important sections of a set of source sections. The language generation model generates text content corresponding to each of the output headings. The output document, e.g., a multi-modal presentation document, includes a set of output sections corresponding to the set of output headings, respectively. For example, the output headings are displayed as titles of presentation slides while content of the output sections are displayed as bullet points following the titles in the presentation slides.

Document summarization is the process of analyzing a source document to produce a concise and appealing document that maintains key points and ideas expressed in the source document. Machine learning models have been used in document processing tasks, such as generating summaries based on input text. However, these conventional models are not able to generate multi-modal presentation documents (e.g., comprising text and image) directly based on source documents. For example, a summary generation tool has to take a user prompt as input to generate an output, rather than taking a source document as input. Furthermore, conventional models depend on user-specified slide titles or template libraries. Hence, content creation process is time-consuming, output presentation is of low quality, and user experience is decreased.

Embodiments of the present disclosure include a document processing apparatus configured to generate a semantic outline of a source document and an output document based on the semantic outline. In some cases, the semantic outline includes a set of output headings and the semantic outline covers important sections of a set of source sections in the source document. For example, the output document comprises a slide presentation including a set of slides corresponding to a set of output sections, respectively. Additionally, the output document comprises the output sections that correspond to the output headings, respectively. A language generation model (e.g., Transformer) generates expanded text content for each heading of the output headings. In the slide presentation, the set of output headings correspond to titles of the slides while expanded text content is listed as bullet points underneath a corresponding title in a slide.

In some embodiments, the document processing apparatus extracts structured text from the source document. The structured text is a hierarchical representation of the source document. A language generation model (e.g., GPT-3.5, GPT-4) obtains a prompt as input such as the prompt includes instructions to generate the semantic outline to cover important sections of the set of source sections in the source document. For example, the prompt fed into the language generation model is "Given headings and summary under that heading, select headings that are important for a presentation: \n". In some cases, the language generation model identifies a predetermined number of output headings in the output document, where the semantic outline is generated based on the predetermined number of output headings.

In some embodiments, the language generation model takes another prompt to generate (expanded) text content corresponding to each of the output headings. The text content is generated based on the semantic outline and the structured text from the source document. For example, the prompt fed into the language generation model is "Create bullet points for a slide from the following text:\n" to generate text content under a target heading in bullet points. In some cases, the language generation model receives, via a user interface, another prompt that includes instructions to modify tonality of the text content. For example, the tonality of the text content can be changed among "formal", "informal", "exciting", "scientific", etc. Then the output document is updated based on user feedback. In some examples, a user-specified prompt is "reduce the content about the community" to simplify page content. Another example prompt includes "show salary and benefits in euros. The current conversion rate is 1.08 dollars for one euro" to change the currency in the output document from dollar to euro.

In some embodiments, the images are extracted from the source document and selected to be included in the output document based on a similarity score between an image and text content under an output heading. Additionally, an image generator (e.g., a diffusion model) generates a synthesized image based on a heading of the output headings. The output document includes the synthesized image in an output section corresponding to the heading.

Embodiments of the disclosure improve on conventional document summarization by automatically generating an output document based on a content-rich source document. The source document comprises multi-modal information (structured text, images) and the generated output document also includes multi-modal information (e.g., slide presentation including a set of slides). The document processing apparatus first generates a semantic outline and generates an output document (e.g., a slide presentation) based on the semantic outline. A language generation model is used to generate the semantic outline comprising a set of output headings based on the structured text. The language generation model ensures that the semantic outline covers important sections of source sections from the source document. Accordingly, expanded text content under each of the output headings, along with relevant images extracted from the source document, can cover the main ideas and points mentioned in the source document while maintaining a visually appealing output (e.g., formatted as bullet points in slides). The document processing apparatus based on the present disclosure increases document processing efficiency by generating output documents based on source documents (e.g., not dependent on user-specified slide titles).

Text Processing System

In FIGS. 1-6, a method, apparatus, and non-transitory computer readable medium for natural language processing are described. One or more embodiments of the method, apparatus, and non-transitory computer readable medium include extracting structured text from a source document, wherein the structured text comprises a plurality of source sections; generating, using a language generation model, a semantic outline based on the structured text, wherein the semantic outline comprises a plurality of output headings; generating, using the language generation model, text content corresponding to each of the plurality of output headings; selecting an image from the source document for each of the plurality of output headings by computing a similarity score between the image and the text content; and generating an output document based on the semantic outline, wherein the output document comprises the selected image, the text content, and a plurality of output sections corresponding to the plurality of output headings, respectively.

Some examples of the method, apparatus, and non-transitory computer readable medium further include generating a prompt for the language generation model that includes instructions to generate the semantic outline to cover important sections of the plurality of source sections.

Some examples of the method, apparatus, and non-transitory computer readable medium further include extracting the image from the source document. Some examples further include selecting the image to represent a heading of the plurality of output headings, wherein the output document includes the selected image in an output section corresponding to the heading.

Some examples of the method, apparatus, and non-transitory computer readable medium further include identifying a plurality of images from the source document and a pre-determined selection factor and filtering the plurality of images based on the pre-determined selection factor to obtain a filtered set of images, wherein the filtered set of images includes the selected image.

Some examples of the method, apparatus, and non-transitory computer readable medium further include generating a multi-modal text embedding based on the text content; generating a multi-modal image embedding based on the image; and computing the similarity score by comparing the multi-modal text embedding and the multi-modal image embedding.

Some examples of the method, apparatus, and non-transitory computer readable medium further include computing a similarity score between the image and text content corresponding to the heading.

Some examples of the method, apparatus, and non-transitory computer readable medium further include generating a synthesized image based on a heading of the plurality of output headings, wherein the output document includes the synthesized image in an output section corresponding to the heading.

In some examples, the semantic outline includes a plurality of sub-headings for a heading of the plurality of output headings. In some examples, a number of the plurality of source sections is greater than a number of the plurality of output headings.

Some examples of the method, apparatus, and non-transitory computer readable medium further include identifying a predetermined number of output headings in the output document, wherein the semantic outline is generated based on the predetermined number of output headings.

Some examples of the method, apparatus, and non-transitory computer readable medium further include obtaining a document template. Some examples further include inserting the plurality of output headings into the document template. In some examples, the output document comprises a slide presentation including a plurality of slides corresponding to the plurality of output sections, respectively.

Some examples of the method, apparatus, and non-transitory computer readable medium further include receiving user feedback on the output document. Some examples further include updating the output document based on the user feedback.

FIG. 1 shows an example of a document processing system according to aspects of the present disclosure. The example shown includes user 100, user device 105, document processing apparatus 110, cloud 115, and database 120. Document processing apparatus 110 is an example of, or includes aspects of, the corresponding element described with reference to FIG. 7.

In an example shown in FIG. 1, a source document (e.g., .docx, .PDF format) is provided by user 100 and transmitted to document processing apparatus 110, e.g., via user device 105 and cloud 115. The source document includes multimodal content (text, images, etc.). An extraction component (e.g., Extract API) is used to extract structured text and images from the source document. The structured text includes a set of source sections. API is short for application programming interface that enables sending information back and forth between a website or app and a user. In some cases, Extract API is used to extract structured text and images from the source document.

Document processing apparatus 110 generates, via a language generation model, a semantic outline based on the structured text. The semantic outline includes a set of output headings. Document processing apparatus 110 generates, via the language generation model, the semantic outline to cover important sections of the source sections. That is, the semantic outline covers important aspects of the source document. Additionally, the language generation model generates text content corresponding to each of the output headings. The output document includes the text content. In some examples, the output document comprises a slide presentation including a set of slides corresponding to the set of output sections, respectively. The phrases of the output headings may be different from the section titles in the source document. User 100 may set a number of slides in the output document.

Document processing apparatus 110 selects images from the source document and places the images to accompany an output heading of a slide. Document processing apparatus 110 returns the output document to user 100 via cloud 115 and user device 105. The output document is of format such as .pptx, .docx, .PDF, etc., and includes visually rich multimodal content. Here, "PPTX" stands for PowerPoint. In some examples, the output document spans multiple pages in length (e.g., multiple slides) and is relatively concise compared to the source document. The process of using document processing apparatus 110 is further described with reference to FIG. 2.

User device 105 may be a personal computer, laptop computer, mainframe computer, palmtop computer, personal assistant, mobile device, or any other suitable processing apparatus. In some examples, user device 105 includes software that incorporates a document processing application (e.g., a document summarization application, slides generator). In some examples, the text editing application on user device 105 may include functions of document processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Document processing apparatus 110 includes a computer implemented network comprising an extraction component, a language generation model, an image selection component, an image generator, and a document generator. Document processing apparatus 110 may also include a processor unit, a memory unit, an I/O module, and a training component. The training component is used to train a machine learning model (or a document processing network). Additionally, document processing apparatus 110 can communicate with database 120 via cloud 115. In some cases, the architecture of the document processing network is also referred to as a network, a machine learning model, or a network model. Further detail regarding the architecture of document processing apparatus 110 is provided with reference to FIGS. 7-9. Further detail regarding the operation of document processing apparatus 110 is provided with reference to FIGS. 2 and 6.

In some cases, document processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., source documents, output documents) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
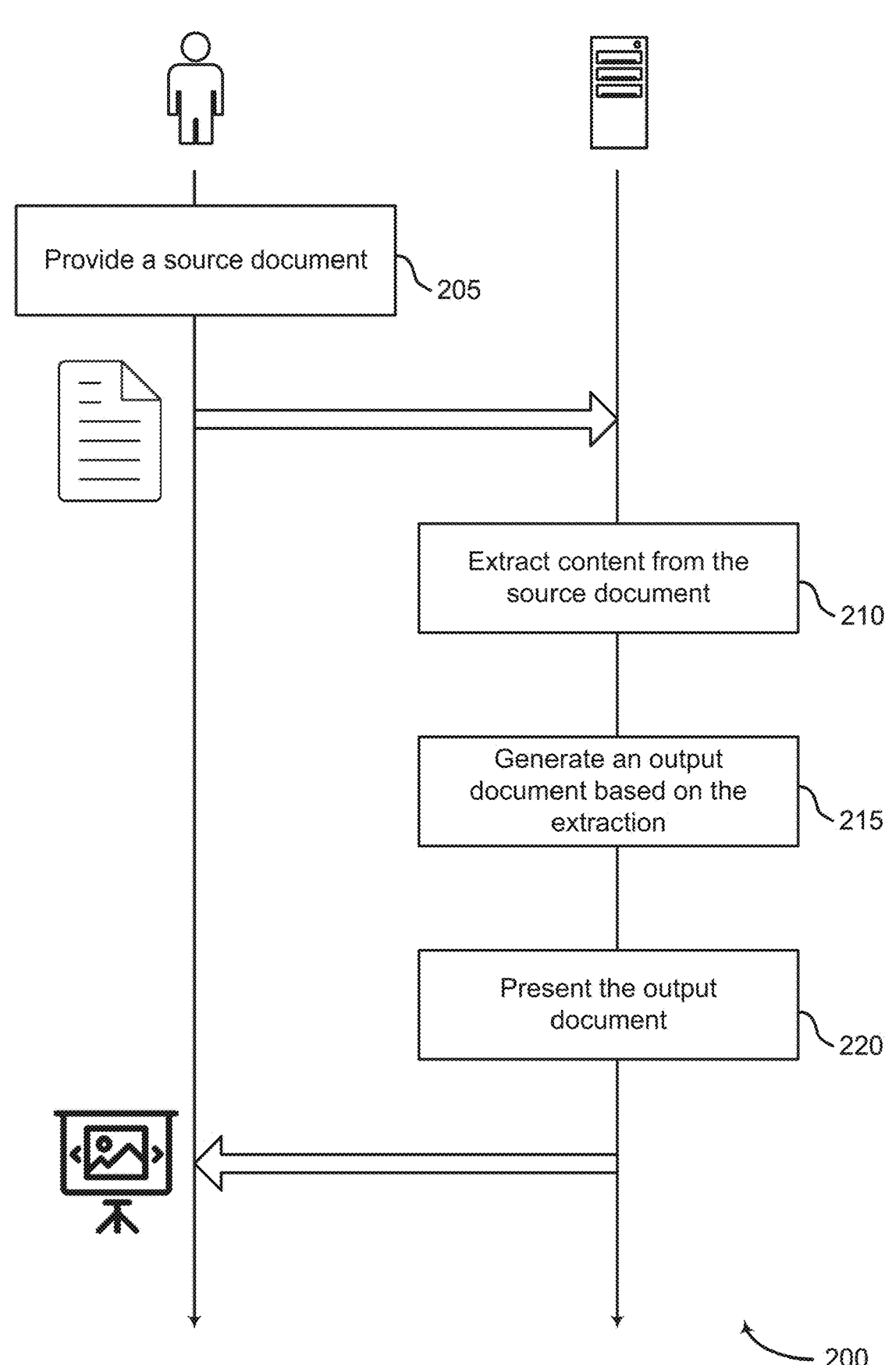
FIG. 2 shows an example of a method for document processing according to aspects of the present disclosure.

FIG. 2 shows an example of a method 200 for document processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system receives a source document from a user. In some cases, the operations of this step refer to, or may be performed by, a user as described with reference to FIG. 1. In some examples, the user uploads the source document via a user device. In some cases, the source document is transmitted to the system from a database (e.g., a cloud database).

At operation 210, the system extracts content from the source document. In some cases, the operations of this step refer to, or may be performed by, a document processing apparatus as described with reference to FIGS. 1 and 7. In some examples, the content includes structured text comprising a set of source sections. The structured text is formatted in an ordering of or includes, e.g., section headings and sub-section headings. The extracted content also includes images, tables, etc., from the source document.

At operation 215, the system generates an output document based on the extraction. In some cases, the operations of this step refer to, or may be performed by, a document processing apparatus as described with reference to FIGS. 1 and 7. In some examples, the output document is a slides deck (i.e., slide presentation including a set of slides corresponding to a set of output sections, respectively). Each slide of the slides deck includes an output heading and text content corresponding to the output heading. The text content may be organized as bullet points that describe the output heading.

At operation 220, the system presents the output document. In some cases, the operations of this step refer to, or may be performed by, a user interface as described with reference to FIGS. 3, 7, 8, 15, and 17. In some cases, the output document (e.g., slides presentation document) is transmitted to the user and can be downloaded or viewed by the user in various file formats such a .pdf or .pptx.

Figure 3:
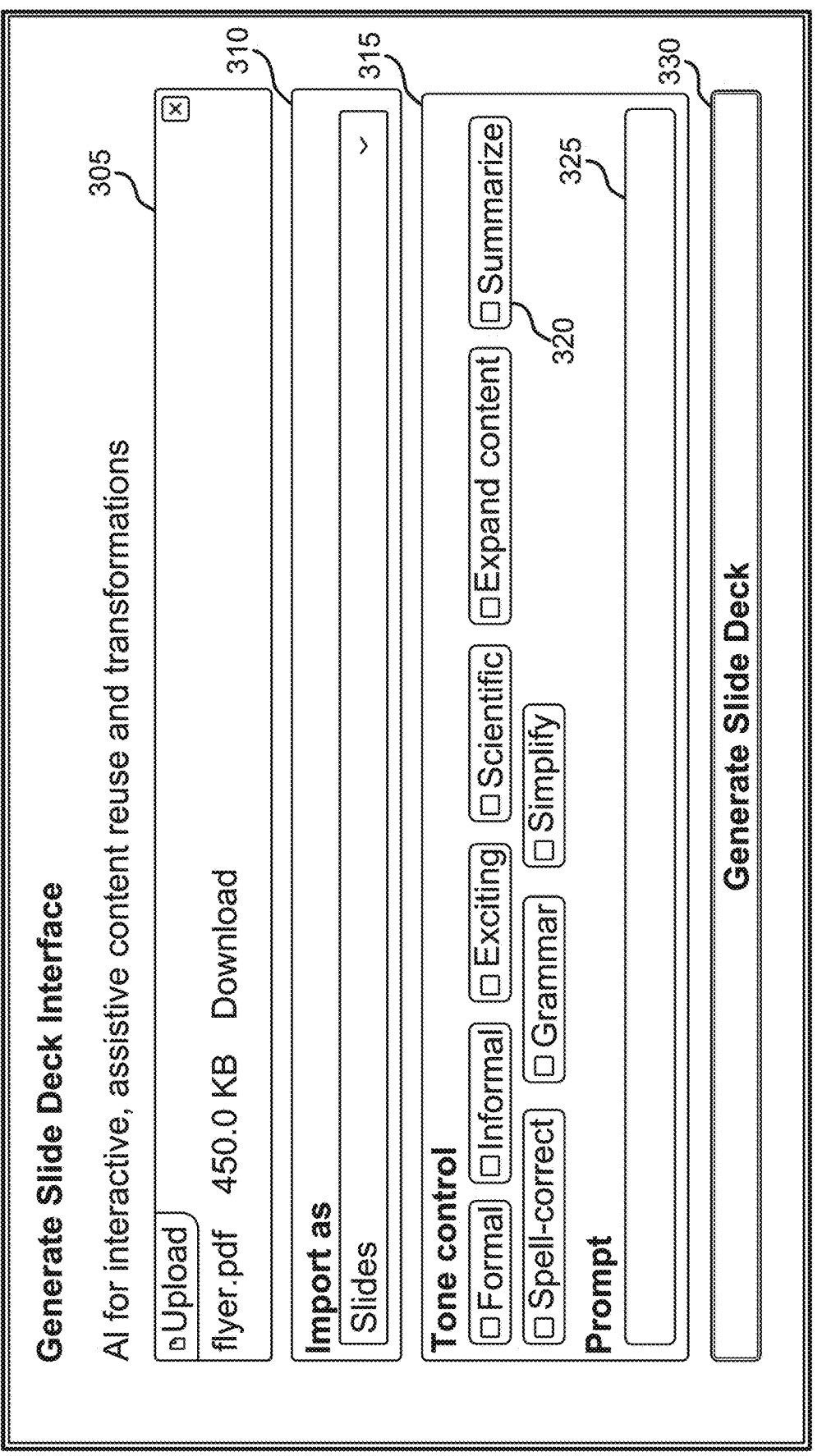
FIG. 3 shows an example of a slides generation user interface according to aspects of the present disclosure.

FIG. 3 shows an example of a user interface 300 for slides generation according to aspects of the present disclosure. The example shown includes user interface 300, upload element 305, import element 310, tone control element 315, tone option 320, prompt element 325, and generate button 330.

According to an embodiment, user interface 300 receives user feedback on the output document. User interface 300 includes upload element 305, import element 310, tone control element 315, tone option 320, prompt element 325, and generate button 330. User interface 300 is an example of, or includes aspects of, the corresponding element described with reference to FIGS. 7, 8, 15, and 17.

Creating presentations is an iterative process, with several editing cycles, before users reach a final version. User interface 300 is used to control and edit the tonality of the entire slides and perform actions such as expanding, simplifying, or condensing the entire presentation or a slide of the presentation. User interface 300 is used to modify the slides to better suit the target audience. A presentation meant for potential candidates for a job needs to sound exciting, whereas the same content meant for senior officials needs to sound formal.

In some examples, tone control element 315 includes a set of controls to update the slides deck. Tone control element 315 includes controls such as tone specific (formal, informal, exciting, scientific, simplify), length specific (expand and summarize), spell check, and grammar check. Some embodiments prompt a language generation model (see FIGS. 7 and 8) for each control with slide content and task definition. The updated output document (slides presentation) is then generated. Tone control element 315 is an example of, or includes aspects of, the corresponding element described with reference to FIGS. 15 and 17. Tone option 320 is an example of, or includes aspects of, the corresponding element described with reference to FIGS. 15 and 17.

Some embodiments generate presentation outline (e.g., slide titles) from a given source document in a single-click and generate a presentation first draft by automatically filling the outline with appropriate content from the source document. The first draft of presentation can be repurposed according to user preferences and target audience. Embodiments of the present disclosure provide interactive user interface 300 to support iterative editing of the presentation drafts by adding, removing, rephrasing, or editing the content in them.

The user interface 300, via prompt element 325, is configured to perform prompt-based editing to edit a slide. A slide title and target edits to be made on a slide are entered and transmitted via prompt element 325. Prompt element 325 enables removing a slide from the output document, i.e., fine-grained updates in the slides deck. In some cases, prompt-based editing is used to convert dollar currency into another currency. Prompt element 325 is an example of, or includes aspects of, the corresponding element described with reference to FIGS. 15 and 17.

Upload element 305 is an example of, or includes aspects of, the corresponding element described with reference to FIGS. 15 and 17. Import element 310 is an example of, or includes aspects of, the corresponding element described with reference to FIGS. 15 and 17. Generate button 330 is an example of, or includes aspects of, the corresponding element described with reference to FIGS. 15 and 17.

Figure 4:
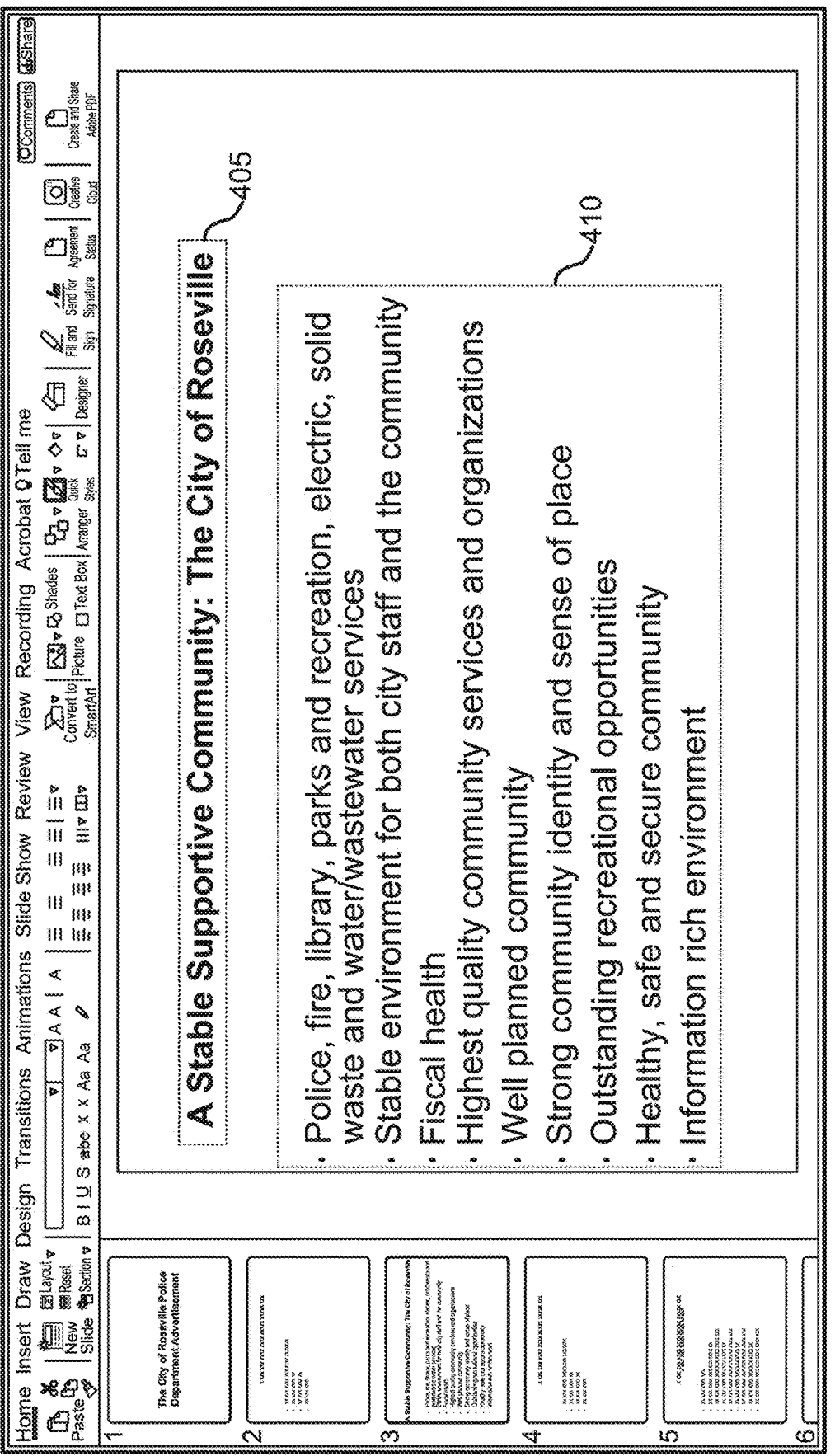
FIGS. 4 and 5 show examples of an output document according to aspects of the present disclosure.

FIG. 4 shows an example of an output document 400 according to aspects of the present disclosure. The example shown includes output document 400, output heading 405, and output section 410. Output document 400 is an example of, or includes aspects of, the corresponding element described with reference to FIGS. 5, 16, and 18. Output heading 405 is an example of, or includes aspects of, the corresponding element described with reference to FIGS. 5, 14, 16, and 18. Output section 410 is an example of, or includes aspects of, the corresponding element described with reference to FIGS. 5, 14, 16, and 18.

Output document 400 includes output heading 405 and output section 410. Output section 410 is formatted in bullet points that describe output heading 405 (e.g., "A Stable Supportive Community: The City of Roseville"). Here, output document 400 is a slide from a generated slides deck.

Figure 5:
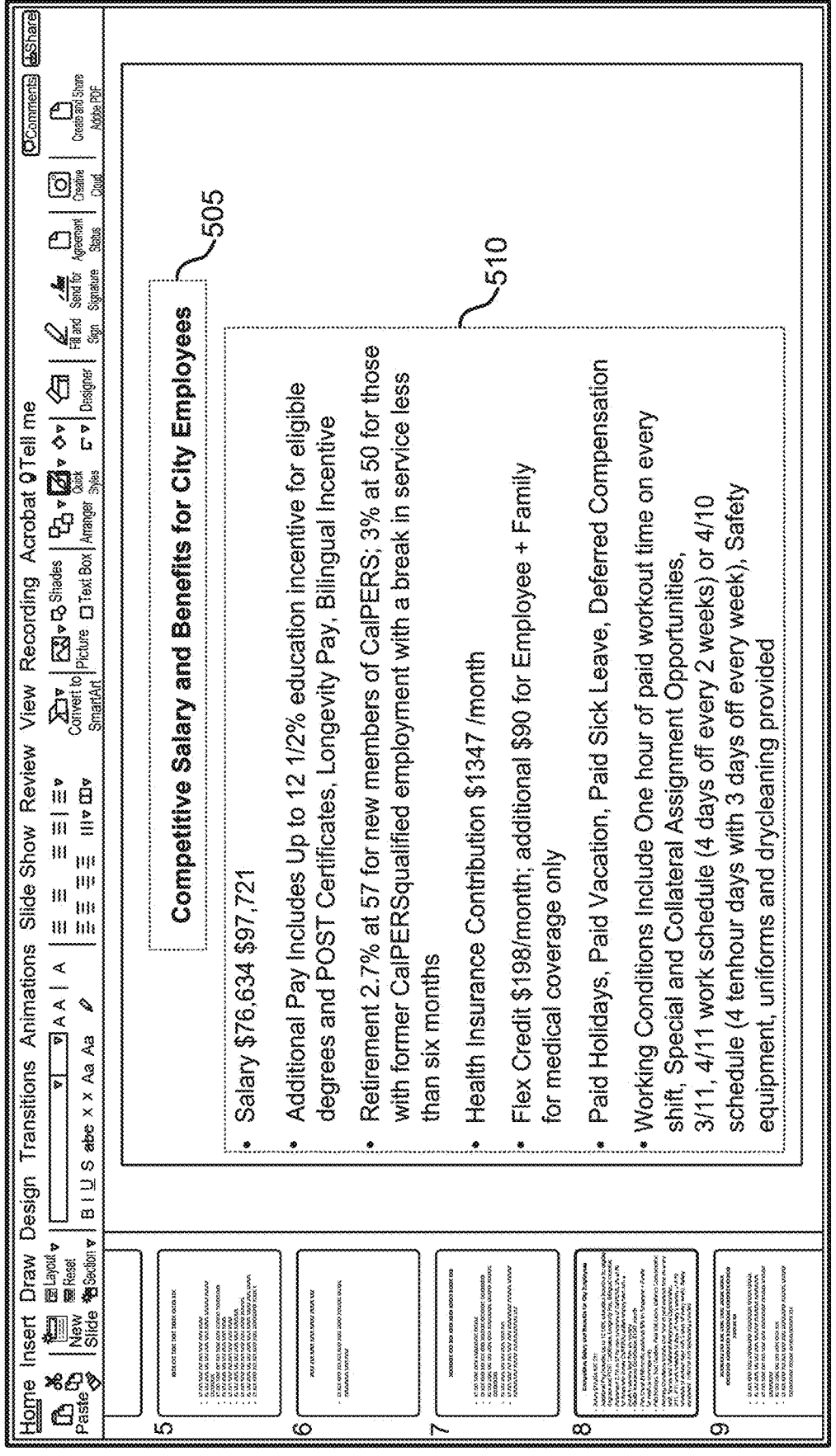

FIG. 5 shows an example of an output document 500 according to aspects of the present disclosure. The example shown includes output document 500, output heading 505, and output section 510. Output document 500 is an example of, or includes aspects of, the corresponding element described with reference to FIGS. 4, 16, and 18. Output heading 505 is an example of, or includes aspects of, the corresponding element described with reference to FIGS. 4, 14, 16, and 18. Output section 510 is an example of, or includes aspects of, the corresponding element described with reference to FIGS. 4, 14, 16, and 18.

Output document 500 includes output heading 505 and output section 510. Output section 510 is formatted in bullet points that describe output heading 505 (e.g., "Competitive Salary and Benefits for City Employees". Referring to FIGS. 4-5, output documents 400 and 500 represent a first slide and a second slide from a same output document.

FIG. 6 shows an example of a method 600 for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system extracts structured text from a source document, where the structured text includes a set of source sections. In some cases, the operations of this step refer to, or may be performed by, an extraction component as described with reference to FIGS. 7 and 8. In some embodiments, the extraction component is configured to extract document content, e.g., using Extract API. The extraction component takes the source document as input and outputs a hierarchical representation of the source document in JSON format. Along with JSON output, images in the source document are extracted. The extracted JSON is then used to generate a semantic outline.

At operation 610, the system generates, using a language generation model, a semantic outline based on the structured text, where the semantic outline includes a set of output headings. In some cases, the operations of this step refer to, or may be performed by, a language generation model as described with reference to FIGS. 7 and 8.

In some embodiments, the language generation model takes the source document as input and generates a semantic outline. The semantic outline is an outline of the output document. The semantic outline contains sections and sub-sections from the source document that appear in the output document (e.g., presentation slides deck). The sections and sub-sections in the semantic outline are listed in order of their appearances in the source document. Each entry in the semantic outline is a section from the source document. In some cases, users control the number of slides in the output document.

In some embodiments, the semantic outline is conditioned on the sections and sub-sections in the source document. A language generation model (e.g., GPT-3.5) is configured to determine whether a section or a sub-section should occur in the output document. In some examples, an input prompt to the language generation model is "Given headings and summary under that heading, select headings that are important for a presentation: n". Following this prompt, section headings and a first sentence under each of the section headings are input to the language generation model. The language generation model generates a list of section headings and sub-section headings that appear in the semantic outline. A summarization model (with reference to FIG. 12) is used to generate headings and a brief summary corresponding to each of the headings.

In the prompt above, users can control the number of slides in the output document. To have a relatively short slides deck, users specify in the prompt that the number of slides should be less and vice versa. The machine learning model (with reference to FIGS. 7-8) iterates over the list from the language generation model. The machine learning model matches each item in the list to a corresponding heading in the source document. In some cases, an exact match is not feasible between a list item and section headings from the source document. Accordingly, Rouge scores are used to determine a match between a list item and each of the section headings. For each item in the list, the machine learning model matches it to the section heading in the source document with which it has the highest Rouge score. The final headings list is referred to as a semantic outline of the output document.

At operation 615, the system generates, using the language generation model, text content corresponding to each of the set of output headings. In some cases, the operations of this step refer to, or may be performed by, a language generation model as described with reference to FIGS. 7 and 8.

In some embodiments, the text content is generated based on the semantic outline (described above) and extracted content from the source document. In some examples, the extracted content is in JSON format. In some examples, the language generation model (e.g., a transformer network) takes the text from the source document to generate content for each slide in an output document. An example prompt for the language generation model (e.g., GPT-3.5) is "Create bullet points for a slide from the following text: n" followed by the content from the source document. The output from the language generation model includes a set of bullet points for the slide content (e.g., a presentation slide from the output document includes the set of bullet points).

At operation 620, the system selects an image from the source document for each of the set of output headings by computing a similarity score between the image and the text content. In some cases, the operations of this step refer to, or may be performed by, an image selection component as described with reference to FIGS. 7 and 8.

In some embodiments, the image selection component identifies a set of images from the source document and a pre-determined selection factor; and filters the set of images based on the pre-determined selection factor to obtain a filtered set of images, where the filtered set of images includes the selected image.

In some embodiments, the image selection component generates a multi-modal text embedding based on the text content; generates a multi-modal image embedding based on the image; and computes the similarity score by comparing the multi-modal text embedding and the multi-modal image embedding.

At operation 625, the system generates an output document based on the semantic outline, where the output document includes the selected image, the text content, and a set of output sections corresponding to the set of output headings, respectively. In some cases, the operations of this step refer to, or may be performed by, a document generator as described with reference to FIGS. 7 and 8.

In some embodiments, the language generation model takes the semantic outline and extracted JSON output as input and generates textual content. The semantic outline is a list of headings that would appear in the output document. The textual content that describes headings in the semantic outline comes from the extracted JSON output. That is, extracted JSON output is used to generate topics and content of the presentation slides using a language generation model. A prompt to the language generation model is "Create a short presentation heading for a slide from the following text: \n" followed by the text from the source document. The output from the language generation model is a short heading used as a slide heading. In some cases, output headings from the language generation model have noise, for example, the presence of extra spaces, the presence of the word "Heading", etc. The machine learning model removes the noise.

In some embodiments, the language generation model generates text content corresponding to each of the output headings based on text from the source document. A prompt to the language generation model is "Create bullet points for a slide from the following text: \n" followed by the content from the source document. The output from the language generation model includes bullet points for the slide content. In some cases, output content from the language generation model includes noise, for example, the presence of extra spaces, the presence of the phrase "Bullet Points", etc. The machine learning model removes the noise. In cases where the slide content overflows, the machine learning model splits the slide content into two slides. The output is a JSON, with the key as a slide heading and the value as the textual content corresponding to the slide heading. If users specify a target audience type (e.g., high school students), the prompts to the language generation model are personalized and modified accordingly.

In some embodiments, the machine learning model (with reference to FIGS. 7-8) automatically generates multi-modal presentations from documents for different target audiences and iteratively refine them with custom user prompts. The machine learning model is not dependent on parallel training data, and instead leverages large language model via prompt chaining. In some examples, the machine learning model takes a long source document as input and generates a list of slide titles to be included in the output document. Users can input prompts to add, delete, or update existing slides, via interactive editing interface and corresponding updates are made to the presentation slides automatically.

Network Architecture

Figure 7:
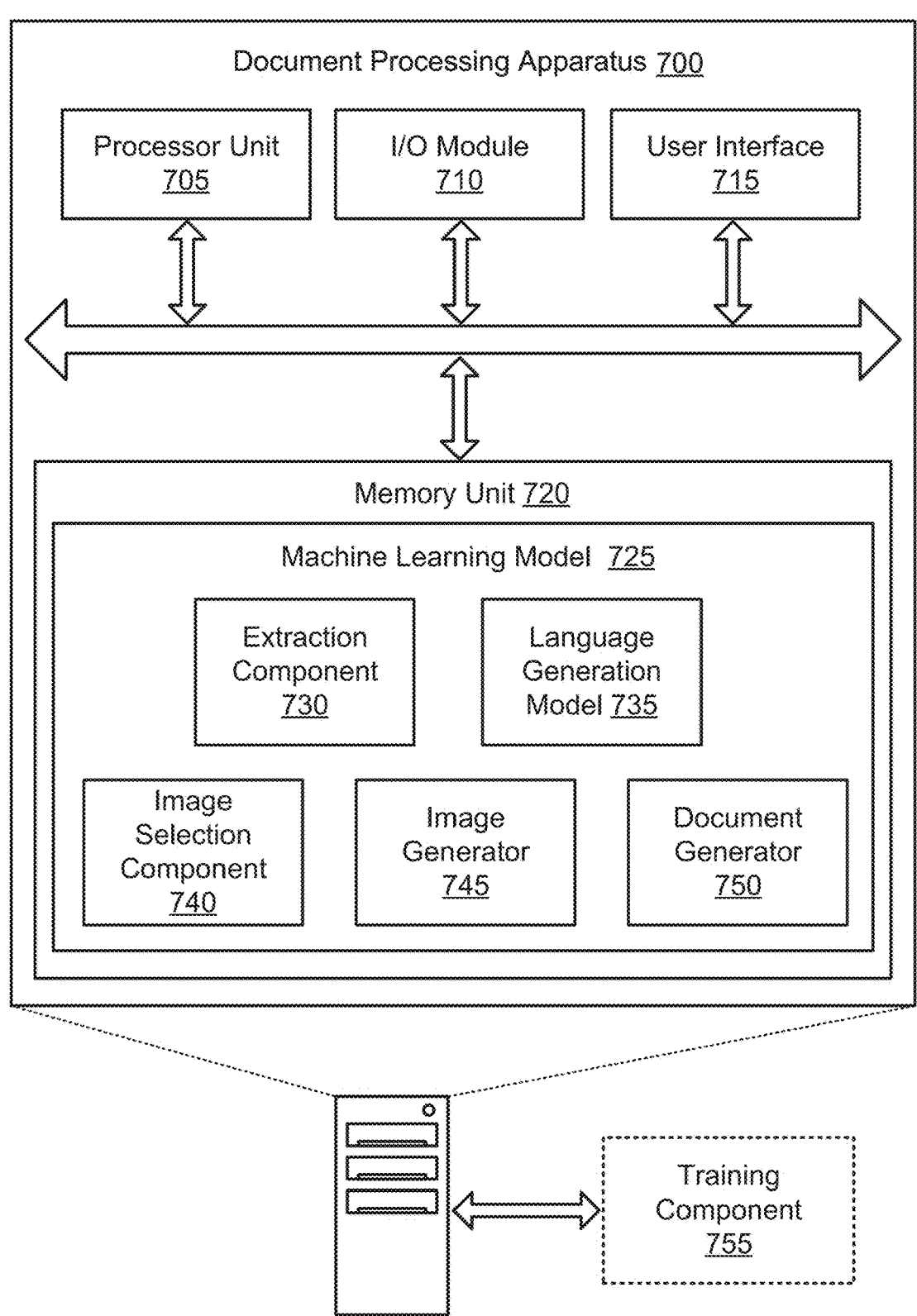
FIG. 7 shows an example of a document processing apparatus according to aspects of the present disclosure.
Figure 8:
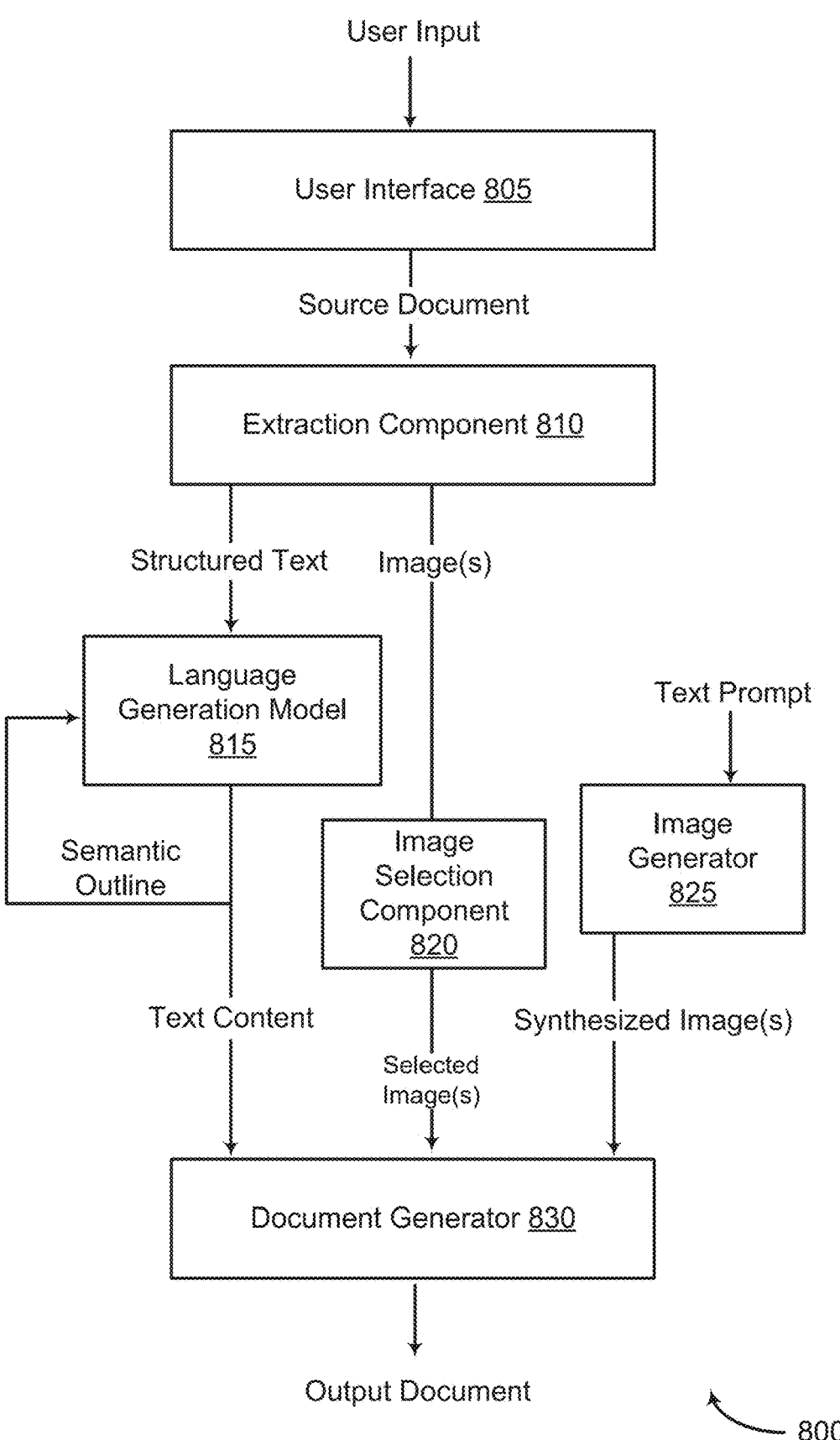
FIG. 8 shows an example of a machine learning model according to aspects of the present disclosure.
Figure 9:
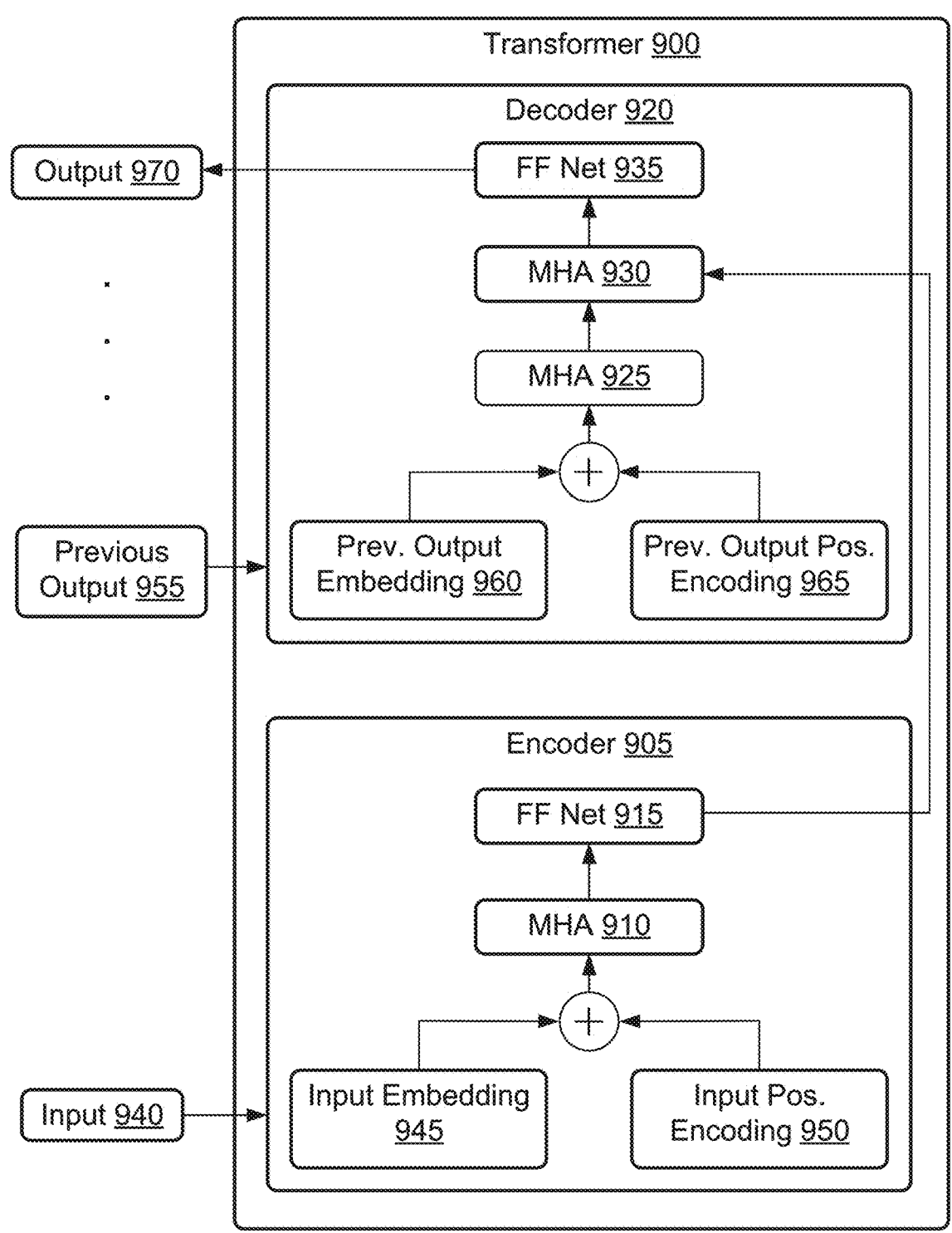
FIG. 9 shows an example of a transformer network according to aspects of the present disclosure.

In FIGS. 7-9, an apparatus and method for natural language processing are described. One or more embodiments of the apparatus and method include at least one processor; at least one memory including instructions executable by the at least one processor; an extraction component comprising parameters stored in the at least one memory and configured to extract structured text from a source document, wherein the structured text comprises a plurality of source sections; a language generation model comprising parameters stored in the at least one memory and configured to generate a semantic outline based on the structured text, wherein the semantic outline comprises a plurality of output headings; and a document generator comprising parameters stored in the at least one memory and configured to generate an output document based on the semantic outline, wherein the output document comprises a plurality of output sections corresponding to the plurality of output headings, respectively.

Some examples of the apparatus and method further include an image selection component configured to select an image to represent a heading of the plurality of output headings, wherein the output document includes the selected image in an output section corresponding to the heading.

Some examples of the apparatus and method further include an image generator configured to generate a synthesized image based on a heading of the plurality of output headings, wherein the output document includes the synthesized image in an output section corresponding to the heading.

Some examples of the apparatus and method further include a user interface configured to receive user feedback on the output document. In some examples, the language generation model is configured to generate text content corresponding to each of the plurality of output headings, wherein the output document includes the text content.

FIG. 7 shows an example of a document processing apparatus 700 according to aspects of the present disclosure. The example shown includes document processing apparatus 700, processor unit 705, I/O module 710, user interface 715, memory unit 720, machine learning model 725, and training component 755. Document processing apparatus 700 is an example of, or includes aspects of, the corresponding element described with reference to FIG. 1. User interface 715 is an example of, or includes aspects of, the corresponding element described with reference to FIGS. 3, 8, 15, and 17.

Machine learning model 725 is an example of, or includes aspects of, the corresponding element described with reference to FIG. 8. In one embodiment, machine learning model 725 includes extraction component 730, language generation model 735, image selection component 740, image generator 745, and document generator 750.

Processor unit 705 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special purpose components for modem processing, baseband processing, digital signal processing, or transmission processing.

Examples of memory unit 720 include random access memory (RAM), read-only memory (ROM), or a hard disk. Examples of memory unit 720 include solid state memory and a hard disk drive. In some examples, memory unit 720 is used to store computer-readable, computer-executable software including instructions that, when executed, cause a processor to perform various functions described herein. In some cases, memory unit 720 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 720 store information in the form of a logical state.

In some examples, at least one memory unit 720 includes instructions executable by the at least one processor unit 705. Memory unit 720 includes machine learning model 725 or stores parameters of machine learning model 725.

I/O module 710 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 710 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, document processing apparatus 700 includes a computer implemented artificial neural network (ANN) for mask prediction and image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the machine learning model 725 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, document processing apparatus 700 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

According to some embodiments, training component 755 initializes machine learning model 725. Training component 755 is used to train language generation model 735 and image generator 745. In some cases, training component 755 (shown in dashed line) is implemented on an apparatus other than document processing apparatus 700.

In some examples, the semantic outline includes a set of sub-headings for a heading of the set of output headings. In some aspects, a number of the set of source sections is greater than a number of the set of output headings. In some aspects, the output document includes a slide presentation including a set of slides corresponding to the set of output sections, respectively. In some examples, machine learning model 725 updates the output document based on the user feedback.

According to some embodiments, extraction component 730 extracts structured text from a source document, where the structured text includes a set of source sections. In some examples, extraction component 730 extracts an image from the source document. Extraction component 730 is an example of, or includes aspects of, the corresponding element described with reference to FIG. 8.

According to some embodiments, language generation model 735 generates a semantic outline based on the structured text, where the semantic outline includes a set of output headings. In some examples, a prompt is generated for the language generation model 735 that includes instructions to generate the semantic outline to cover important sections of the set of source sections. In some examples, language generation model 735 generates text content corresponding to each of the set of output headings, where the output document includes the text content. In some examples, language generation model 735 identifies a predetermined number of output headings in the output document, where the semantic outline is generated based on the predetermined number of output headings. Language generation model 735 is an example of, or includes aspects of, the corresponding element described with reference to FIG. 8.

According to some embodiments, image selection component 740 selects the image to represent a heading of the set of output headings, where the output document includes the selected image in an output section corresponding to the heading. In some examples, image selection component 740 identifies a set of images from the source document and a pre-determined selection factor. Image selection component 740 filters the set of images based on the pre-determined selection factor to obtain a filtered set of images, wherein the filtered set of images includes the selected image.

According to some embodiments, image selection component 740 generates a multi-modal text embedding based on the text content; generates a multi-modal image embedding based on the image; and computes the similarity score by comparing the multi-modal text embedding and the multi-modal image embedding.

In some examples, image selection component 740 computes a similarity score between the image and text content corresponding to the heading. Image selection component 740 is an example of, or includes aspects of, the corresponding element described with reference to FIG. 8.

According to some embodiments, image generator 745 generates a synthesized image based on a heading of the set of output headings, where the output document includes the synthesized image in an output section corresponding to the heading. Image generator 745 is an example of, or includes aspects of, the corresponding element described with reference to FIG. 8.

In an embodiment, image generator 745 comprises a diffusion model. Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

According to some embodiments, document generator 750 generates an output document based on the semantic outline, where the output document includes a set of output sections corresponding to the set of output headings, respectively. In some examples, document generator 750 obtains a document template. In some examples, document generator 750 inserts the set of output headings into the document template. Document generator 750 is an example of, or includes aspects of, the corresponding element described with reference to FIG. 8.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 8 shows an example of a machine learning model 800 according to aspects of the present disclosure. The example shown includes machine learning model 800, user interface 805, extraction component 810, language generation model 815, image selection component 820, image generator 825, and document generator 830. Machine learning model 800 is an example of, or includes aspects of, the corresponding element described with reference to FIG. 7.

User interface 805 is an example of, or includes aspects of, the corresponding element described with reference to FIGS. 3, 7, 15, and 17.

In some embodiments, machine learning model 800 is configured to automatically generate first drafts for presentations and iterative refinement, via large language modeling. The input to machine learning model 800 is a source document, and the output is a presentation based on that source document that a user can update/edit iteratively. In some cases, machine learning model 800 comprises three modules. The first module takes the source document as input and automatically generates a semantic outline for the presentation draft by considering the document's various section headings and content. The first module is configured to let users control the number of slides they want. The second module fills the textual content for each slide given the slide heading from the semantic outline by identifying appropriate text from the source document that is relevant to the given slide. The second module does so by extracting semantically similar portions of the document for the given slide title and obtaining a concise version in presentation style. This enables users to bypass going through long documents to create a first draft of a presentation that they can repurpose according to their preferences. The third module identifies images from the source document that may be relevant to each slide and adds images to corresponding slides. If no image is relevant to a slide, then no image is added.

Machine learning model 800 enables users to bypass the tedious process of going through long documents to create a first draft of a presentation that they can repurpose according to their preferences. Machine learning model 800 supports personalization to specific target audience for various communication purposes. Furthermore, machine learning model 800 includes an interactive and editing interface in which users can provide custom prompts to iteratively edit the presentation slides by adding new slides or deleting or rephrasing existing ones. Hence, iterative editing enables users to repurpose their presentation to suit their target audience better.

Extraction component 810 is configured to extract structured text from a source document. The structured text includes a set of source sections. Extraction component 810 is an example of, or includes aspects of, the corresponding element described with reference to FIG. 7.

Language generation model 815 generates a semantic outline based on the structured text, where the semantic outline comprises a set of output headings. Language generation model 815 is an example of, or includes aspects of, the corresponding element described with reference to FIG. 7.

Image selection component 820 selects relevant images from the source document based on textual content of the slides. The images are added to the slides. Machine learning model 800 generates a vector representation for an image extracted from the source document using a multi-modal encoder such as CLIP (Contrastive Language-Image Pre-Training). CLIP model is a neural network trained on a variety of image-text pairs.

For each slide, machine learning model 800 generates a vector representation of textual content of an output section using a multi-modal encoder. The multi-modal encoder generates a text embedding based on an input text (e.g., an output section). The multi-modal encoder generates an image embedding based on an extracted image from the source document. The text embedding and the image embedding are in a multi-modal embedding space.

To obtain images for each slide, image selection component 820 compares the vector representation of textual content with the vector representation of each image. If a cosine similarity score between an image and textual content of an output section is larger than a pre-determined number, image selection component 820 includes the image in that slide. In some examples, the pre-determined number is 0.8. An image from the source document may appear in multiple slides of the output document. For example, an image is some meta-image relevant to the entire slides deck. At post-processing phase, users can choose to remove images from the output document. Each slide has zero to multiple images. Image selection component 820 is an example of, or includes aspects of, the corresponding element described with reference to FIG. 7.

Document generator 830 is configured to generate an output document based on the semantic outline. The output document comprises a set of output sections corresponding to the set of output headings, respectively. In some examples, document generator 830 converts the JSON into Microsoft® PowerPoint format using a python-pptx library. The output document is a MS PowerPoint presentation including text and images present in the slides. Document generator 830 is an example of, or includes aspects of, the corresponding element described with reference to FIG. 7.

According to some embodiments, image generator 825 generates a synthesized image based on an output heading of the output headings, where the output document includes the synthesized image. In some examples, a diffusion model generates a synthesized image based on a text prompt (e.g., a prompt containing a slide heading). Image generator 825 is an example of, or includes aspects of, the corresponding element described with reference to FIG. 7.

FIG. 9 shows an example of a transformer network according to aspects of the present disclosure. The example shown includes transformer 900, encoder 905, decoder 920, input 940, input embedding 945, input positional encoding 950, previous output 955, previous output embedding 960, previous output positional encoding 965, and output 970.

In some cases, encoder 905 includes multi-head self-attention sublayer 910 and feed-forward network sublayer 915. In some cases, decoder 920 includes first multi-head self-attention sublayer 925, second multi-head self-attention sublayer 930, and feed-forward network sublayer 935.

According to some aspects, a machine learning model (such as the machine learning model described with reference to FIGS. 7 and 8) comprises transformer 900. In some cases, encoder 905 is configured to map input 940 (for example, a query or a prompt comprising a sequence of words or tokens) to a sequence of continuous representations that are fed into decoder 920. In some cases, decoder 920 generates output 970 (e.g., a prediction of an output sequence of words or tokens) based on the output of encoder 905 and previous output 955 (e.g., a previously predicted output sequence), which allows for the use of autoregression.

For example, in some cases, encoder 905 parses input 940 into tokens and vectorizes the parsed tokens to obtain input embedding 945, and adds input positional encoding 950 (e.g., positional encoding vectors for input 940 of a same dimension as input embedding 945) to input embedding 945. In some cases, input positional encoding 950 includes information about relative positions of words or tokens in input 940.

In some cases, encoder 905 comprises one or more encoding layers (e.g., six encoding layers) that generate contextualized token representations, where each representation corresponds to a token that combines information from other input tokens via self-attention mechanism. In some cases, each encoding layer of encoder 905 comprises a multi-head self-attention sublayer (e.g., multi-head self-attention sublayer 910). In some cases, the multi-head self-attention sublayer implements a multi-head self-attention mechanism that receives different linearly projected versions of queries, keys, and values to produce outputs in parallel. In some cases, each encoding layer of encoder 905 also includes a fully connected feed-forward network sublayer (e.g., feed-forward network sublayer 915) comprising two linear transformations surrounding a Rectified Linear Unit (ReLU) activation:

$$FFN(x) = ReLU(W_1x + b_1)W_2 + b_2 \qquad (1)$$

In some cases, each layer employs different weight parameters ($W_1$, $W_2$) and different bias parameters ($b_1$, $b_2$) to apply a same linear transformation each word or token in input 940.

In some cases, each sublayer of encoder 905 is followed by a normalization layer that normalizes a sum computed between a sublayer input x and an output sublayer(x) generated by the sublayer:

$$layernorm(x + sublayer(x)) \qquad (2)$$

In some cases, encoder 905 is bidirectional because encoder 905 attends to each word or token in input 940 regardless of a position of the word or token in input 940.

In some cases, decoder 920 comprises one or more decoding layers (e.g., six decoding layers). In some cases, each decoding layer comprises three sublayers including a first multi-head self-attention sublayer (e.g., first multi-head self-attention sublayer 925), a second multi-head self-attention sublayer (e.g., second multi-head self-attention sublayer 930), and a feed-forward network sublayer (e.g., feed-forward network sublayer 935). In some cases, each sublayer of decoder 920 is followed by a normalization layer that normalizes a sum computed between a sublayer input x and an output sublayer(x) generated by the sublayer.

In some cases, decoder 920 generates previous output embedding 960 of previous output 855 and adds previous output positional encoding 965 (e.g., position information for words or tokens in previous output 955) to previous output embedding 960. In some cases, each first multi-head self-attention sublayer receives the combination of previous output embedding 960 and previous output positional encoding 965 and applies a multi-head self-attention mechanism to the combination. In some cases, for each word in an input sequence, each first multi-head self-attention sublayer of decoder 920 attends only to words preceding the word in the sequence, and so transformer 900's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 905 by receiving a query Q from a previous sublayer of decoder 920 and a key K and a value V from the output of encoder 905, allowing decoder 920 to attend to each word in the input 940.

In some cases, each feed-forward network sublayer implements a fully connected feed-forward network similar to feed-forward network sublayer 915. In some cases, the feed-forward network sublayers are followed by a linear transformation and a softmax to generate a prediction of output 970 (e.g., a prediction of a next word or token in a sequence of words or tokens). Accordingly, in some cases, transformer 900 generates a response as described herein based on a predicted sequence of words or tokens.

Document Generation

FIG. 10 shows an example of a source document 1000 according to aspects of the present disclosure. The example shown includes source document 1000, original title 1005, first section heading 1010, first section content 1015, first image 1020, second section heading 1025, second section content 1030, and second image 1035.

In an example illustrated in FIG. 10, source document 1000 has a document title, i.e., original title 1005 ("The Science of Earthquakes"). Source document 1000 includes first section heading 1010 and second section heading 1025. First section heading 1010 is titled "What is an earthquake?". Second section heading 1025 is titled "What causes earthquakes and where do they happen?". First section content 1015 includes a set of sentences or paragraphs to elaborate on first section heading 1010. First image 1020 is positioned on the right-hand side in relation to first section content 1015. Second section content 1030 includes a set of sentences or paragraphs to elaborate on second section heading 1025. Second image 1035 is positioned on the left-hand side in relation to second section content 1030.

First section heading 1010 is an example of, or includes aspects of, the corresponding element described with reference to FIGS. 11 and 12. Second section heading 1025 is an example of, or includes aspects of, the corresponding element described with reference to FIGS. 11 and 12.

FIG. 11 shows an example of model input 1100 to a transformer network according to aspects of the present disclosure. The example shown includes model input 1100, first section heading 1105, first section summary 1110, second section heading 1115, and second section summary 1120.

In an example illustrated in FIG. 11, model input 1100 includes first section heading 1105 ("1. What is an Earthquake?") and second section heading 1115 ("2. What causes Earthquakes and Where Do They Happen?"). In an embodiment, a machine learning model (with reference to FIGS. 7 and 8) generates first section summary 1110 that describes first section heading 1105. The machine learning model generates second section summary 1120 that describes second section heading 1115.

Referring to FIGS. 10 and 11, section headings in model input 1100 may not match the exact phrases as in the source document 1000. For example, section headings in model input 1100 (e.g., first section heading 1105, second section heading 1115, . . . ) include sequence numerals (e.g., "1.", "2.") to indicate an ordering. Words of section headings in model input 1100 are capitalized and words in headings from source document 1000 are not capitalized. (e.g., first section heading 1010 and second section heading 1025). In some cases, second section heading 1115 is generated by a language generation model and is phrased as "2. What is a cause of Earthquakes and their locations?").

First section heading 1105 is an example of, or includes aspects of, the corresponding element described with reference to FIGS. 10 and 12. Second section heading 1115 is an example of, or includes aspects of, the corresponding element described with reference to FIGS. 10 and 12.

Figure 12:
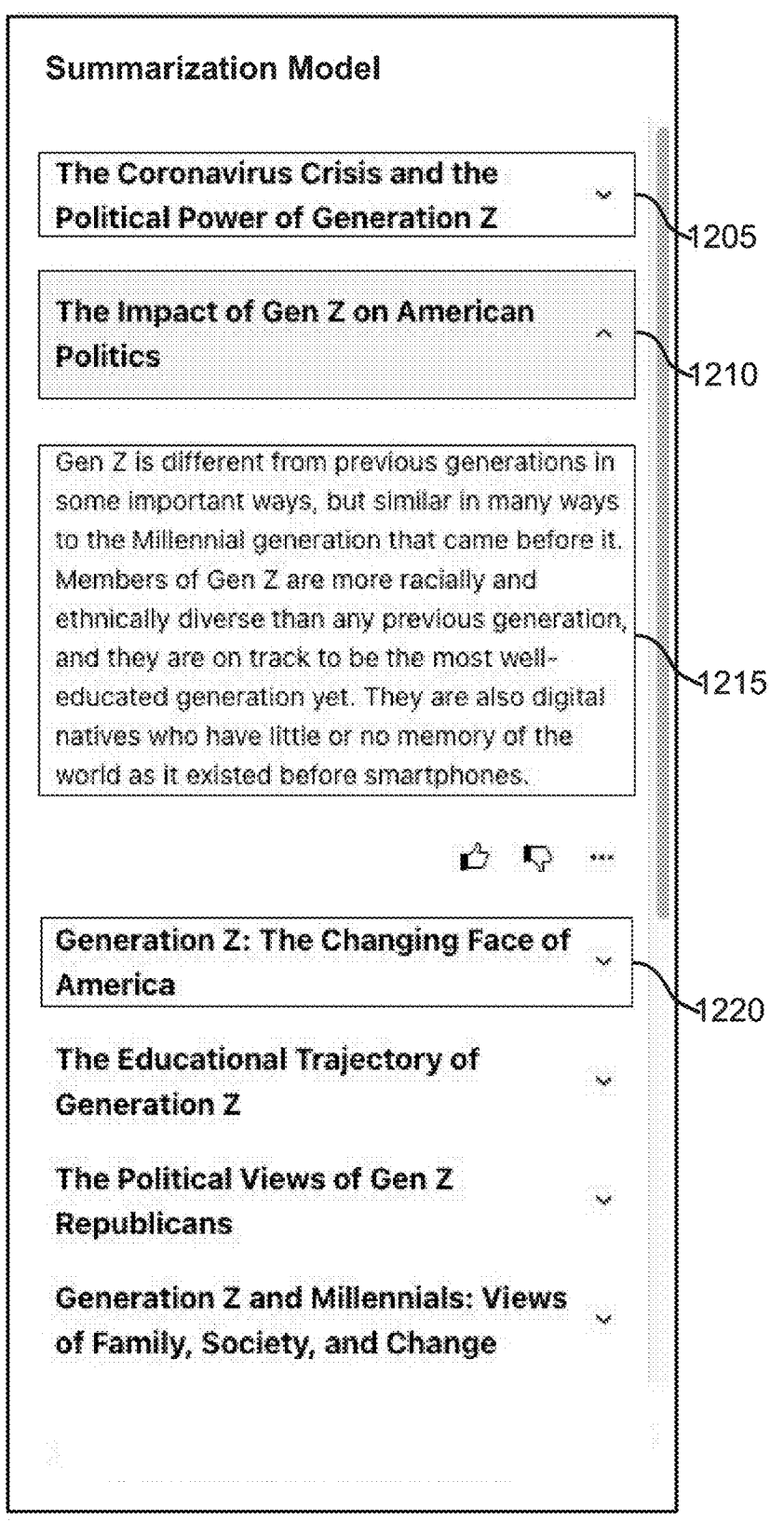
FIG. 12 shows an example of a summarization model according to aspects of the present disclosure.

FIG. 12 shows an example of a summarization model 1200 according to aspects of the present disclosure. The example shown includes summarization model 1200, first section heading 1205, second section heading 1210, section summary 1215, and third section heading 1220.

In some embodiments, summarization model 1200 is used to generate headings and summaries under corresponding headings. Outputs from summarization model 1200 is then fed to a language generation model (with reference to FIGS. 7 and 8) to generate a semantic outline. An example of the semantic outline is described in greater detail in FIG. 13. Summarization model 1200 outputs a brief summary for each section and sub-section in the source document. In some examples, maximum depth is set to two. In some examples, summarization model 1200 generates first section heading 1205, second section heading 1210, and third section heading 1220. Summarization model 1200 generates section summary 1215 for second section heading 1210. Section summary 1215 includes one or more sentences that describe second section heading 1210 (e.g., "The impact of Gen Z on American politics").

First section heading 1205 is an example of, or includes aspects of, the corresponding element described with reference to FIGS. 10 and 11. Second section heading 1210 is an example of, or includes aspects of, the corresponding element described with reference to FIGS. 10 and 11.

FIG. 13 shows an example of a semantic outline 1300 according to aspects of the present disclosure. The example shown includes semantic outline 1300, first output heading 1305, second output heading 1310, and third output heading 1315.

In some embodiments, a language generation model (with reference to FIGS. 7 and 8) is used to generate semantic outline 1300. The semantic outline 1300 is conditioned on the sections and sub-sections in a source document. The language generation model (e.g., GPT-3.5) is used to determine whether a section and/or a sub-section should occur in the output document (e.g., slides presentation).

In some examples, an input prompt to the language generation model is "Given headings and summary under that heading, select headings that are important for a presentation: n", and following this prompt, each section heading and the first sentence of that section are input to the language generation model. The language generation model outputs a list of section headings and sub-section headings that occur in the semantic outline 1300.

Referring to an example shown in FIG. 13, semantic outline 1300 includes first output heading 1305, second output heading 1310, and third output heading 1315. First output heading 1305 is "Understanding Earthquakes: The Basics". First output heading 1305 may include sub-heading 1 and sub-heading 2, as an example. Second output heading 1310 is "What causes Earthquakes and Where Do They Happen?". Third output heading 1315 is "Why Does the Earth Shake When There Is an Earthquake?".

Figure 14:
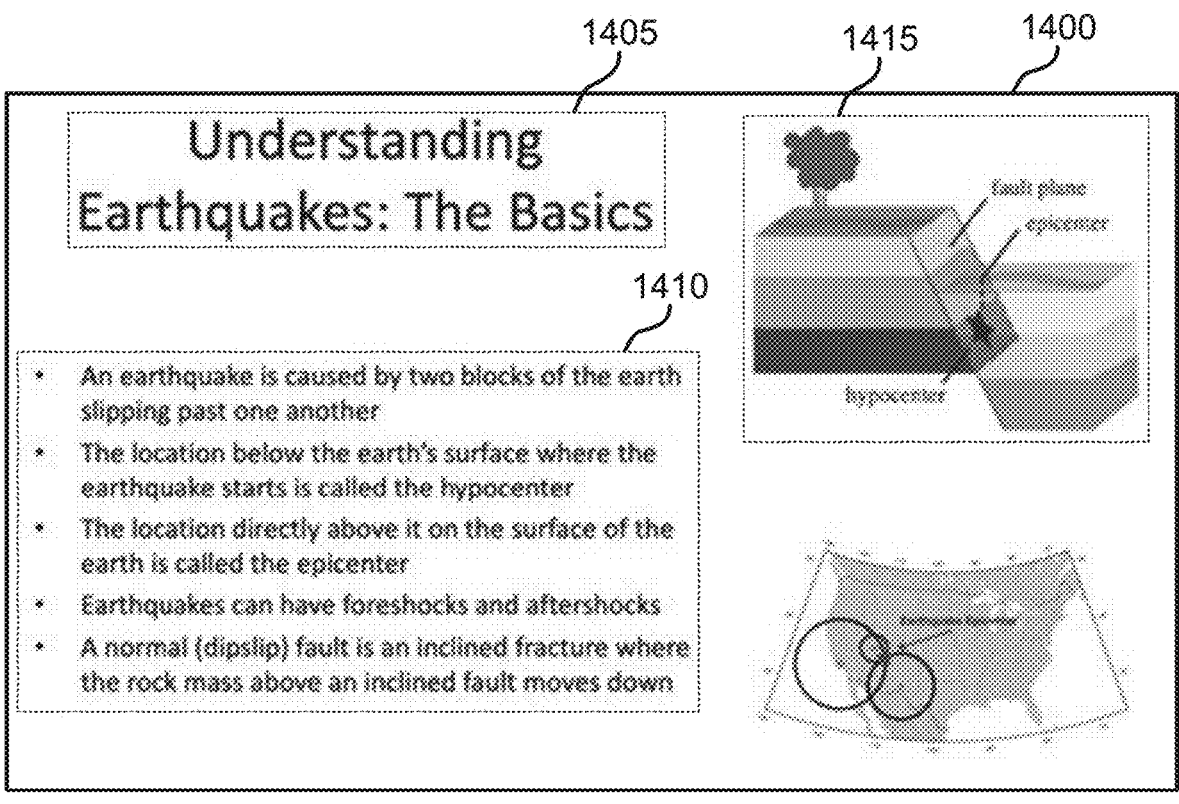
FIG. 14 shows an example of a presentation slide of an output document according to aspects of the present disclosure.

FIG. 14 shows an example of a presentation slide 1400 of an output document according to aspects of the present disclosure. The example shown includes presentation slide 1400, output heading 1405, output section 1410, and image 1415. Output heading 1405 is an example of, or includes aspects of, the corresponding element described with reference to FIGS. 4, 5, 16, and 18. Output section 1410 is an example of, or includes aspects of, the corresponding element described with reference to FIGS. 4, 5, 16, and 18.

For example, presentation slide 1400 includes output heading 1405, output section 1410, and image 1415. Output section 1410 is formatted in bullet points that describe output heading 1405 ("Understanding Earthquakes: The Basics"). Image 1415 is placed next to output section 1410. Presentation slide 1400 is one slide from an output slides deck that includes multiple slides.

In some examples, presentation slide 1400 includes a set of bullet points summarizing main ideas related to output heading 1405. Presentation slide 1400 is a visually rich multi-modal representation of a source document. The output document (e.g., slides deck) includes multiple pages and is relatively concise compared to the source document.

Figure 15:
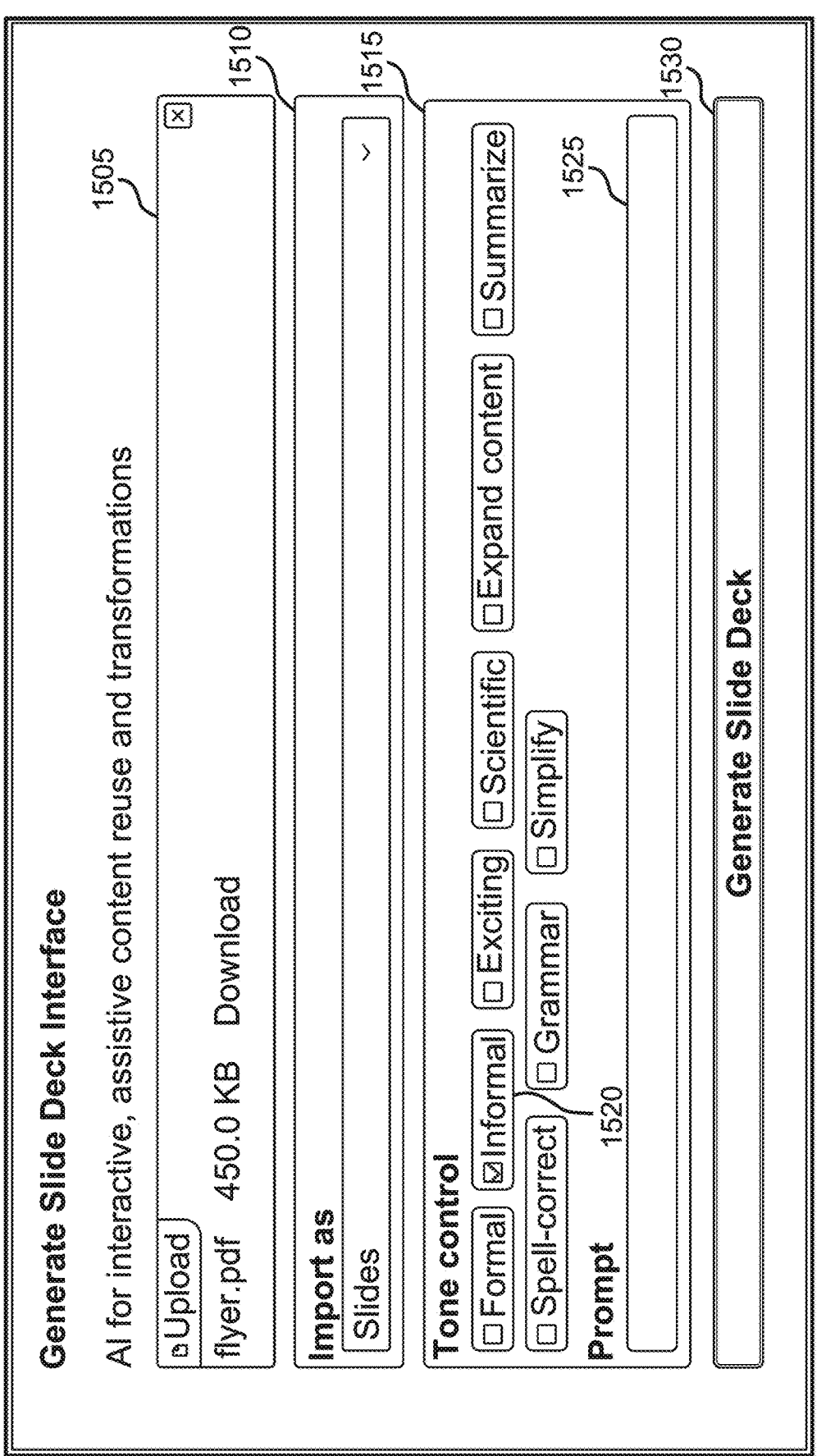
FIG. 15 shows an example of a user interface according to aspects of the present disclosure.

FIG. 15 shows an example of a user interface 1500 according to aspects of the present disclosure. The example shown includes user interface 1500, upload element 1505, import element 1510, tone control element 1515, tone option 1520, prompt element 1525, and generate button 1530.

In some examples, a user uploads, via upload element 1505 of user interface 1500, a source document (e.g., flyer.pdf). The source document is a flyer about latest job opportunity at Roosevelt Police Department, discussing the city, the community, job requirement, etc. The user selects "Import as Slides", via import element 1510, from generative options such as "Cover page", "Infographics", and "Slides". The user clicks generate button 1530, e.g., "Generate Slide Deck" button. The document processing apparatus (with reference to FIG. 7) generates slides deck that shows up on the user interface 1500. In some examples, slides deck is in .pdf format. Users can download the slide deck in Microsoft® PowerPoint format by clicking the download button.

In some embodiments, the user changes the tone of the slides by clicking on one of the tone options (e.g., tone option 1520 "informal"). Additionally or alternatively, the user enters a prompt, via prompt element 1525, to edit a generated slides deck.

After generating a slide deck, the machine learning model (with reference to FIGS. 7 and 8) enables users to edit interactively the tonality of the entire slides using tone control element 1515 (or "tone control" panel). The machine learning model includes multiple tone options to choose from, e.g., formal, informal, exciting, scientific, expand content, summarize, spell-correct, grammar, and simplify. Users select a suitable tone according to the nature of the presentation. Slide titles and content corresponding to each slide are affected by user choice. That is, selecting tone option 1520 has an impact on titles and content in the output document.

The machine learning model enables users to edit the entire slides deck or user-specific slides using prompts. For example, a prompt of "reduce the content about the community" is entered via prompt element 1525. The prompt is input to a language generation model to simplify one or more slides about the community.

User interface 1500 is an example of, or includes aspects of, the corresponding element described with reference to FIGS. 3, 7, 8, and 17. Upload element 1505 is an example of, or includes aspects of, the corresponding element described with reference to FIGS. 3 and 17. Import element 1510 is an example of, or includes aspects of, the corresponding element described with reference to FIGS. 3 and 17. Tone control element 1515 is an example of, or includes aspects of, the corresponding element described with reference to FIGS. 3 and 17. Tone option 1520 is an example of, or includes aspects of, the corresponding element described with reference to FIGS. 3 and 17. Prompt element 1525 is an example of, or includes aspects of, the corresponding element described with reference to FIGS. 3 and 17. Generate button 1530 is an example of, or includes aspects of, the corresponding element described with reference to FIGS. 3 and 17.

Figure 16:
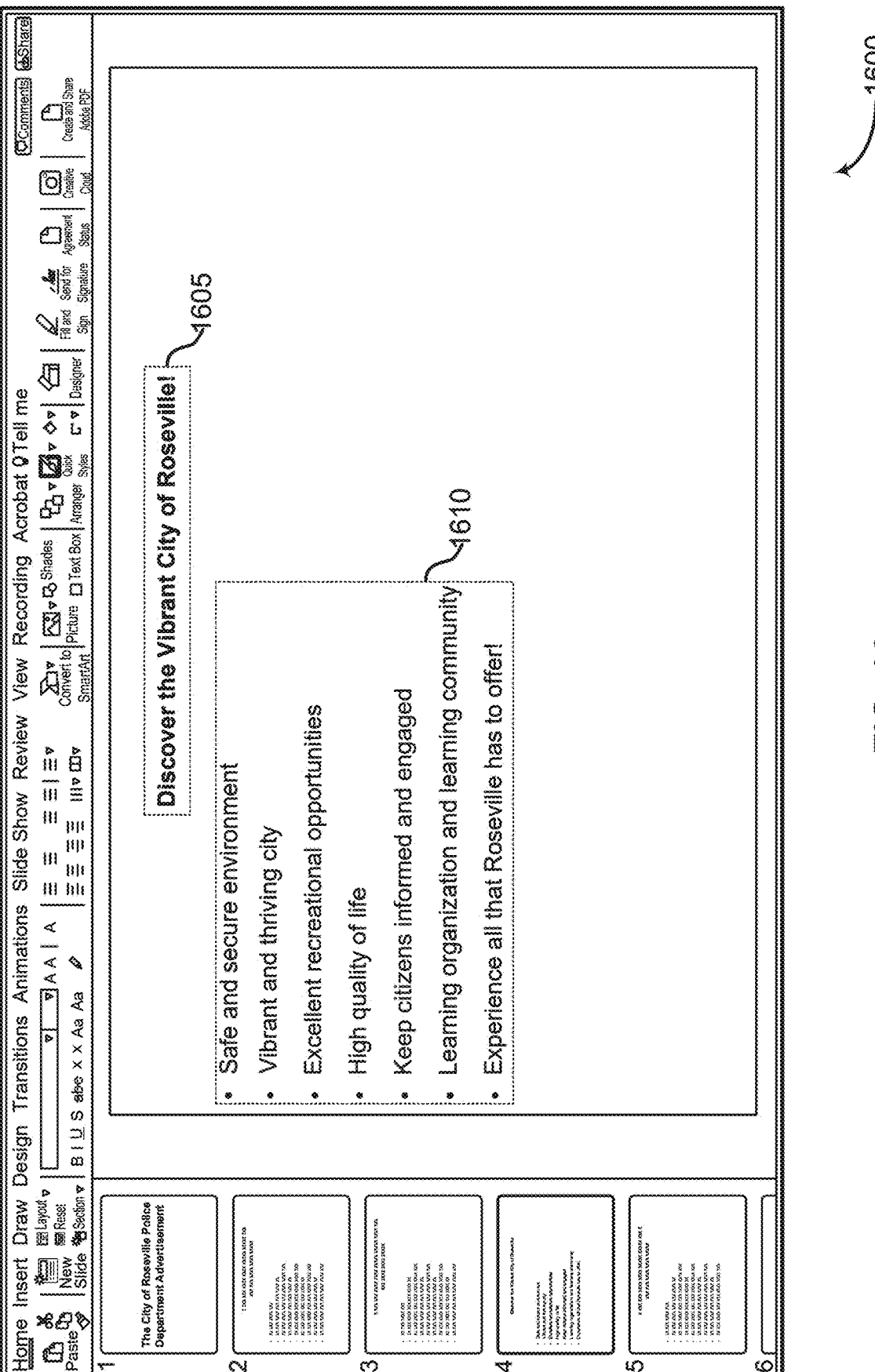
FIG. 16 shows an example of a presentation slide of an output document according to aspects of the present disclosure.

FIG. 16 shows an example of a presentation slide of an output document 1600 according to aspects of the present disclosure. The example shown includes output document 1600, output heading 1605, and output section 1610. Output document 1600 includes output heading 1605 and output section 1610. Output section 1610 is formatted in bullet points that describe output heading 1605. Referring to FIGS. 4 and 15-16, output document 1600 is updated based on tone option 1520 ("informal"). Iterative editing allows users to update the slides to suit their target audience better. The examples below are slides from a police flyer describing Roseville City. The slide in FIG. 4 targets formal audiences like senior police officers, while the updated slide in FIG. 16 targets college graduates to encourage them to join the police department. The slide in FIG. 4 is formal, whereas the updated slide in FIG. 16 is informal and exciting.

Output document 1600 is an example of, or includes aspects of, the corresponding element described with reference to FIGS. 4, 5, and 18. Output heading 1605 is an example of, or includes aspects of, the corresponding element described with reference to FIGS. 4, 5, 14, and 18. Output section 1610 is an example of, or includes aspects of, the corresponding element described with reference to FIGS. 4, 5, 14, and 18.

Figure 17:
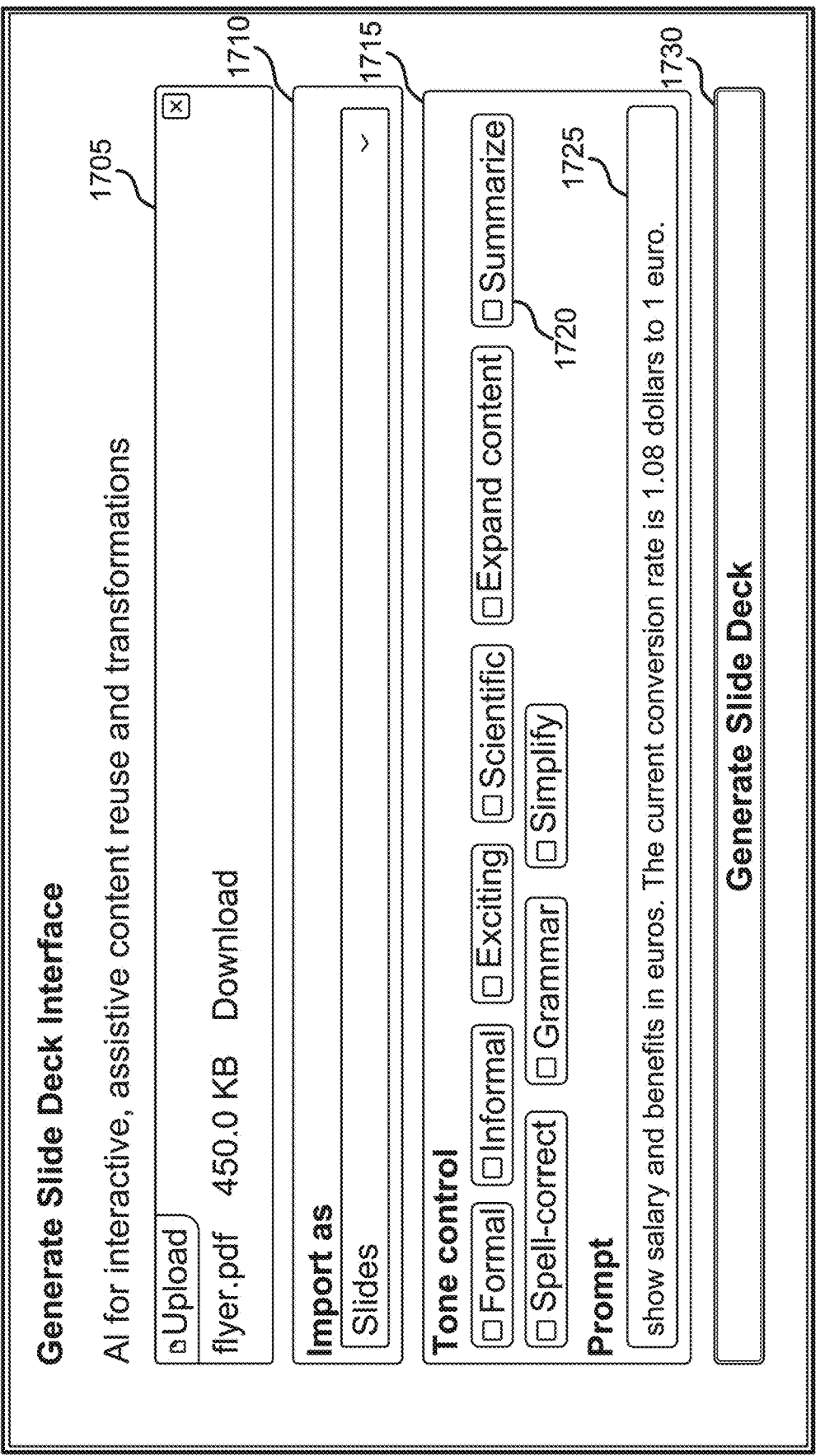
FIG. 17 shows an example of a user interface according to aspects of the present disclosure.

FIG. 17 shows an example of a user interface 1700 according to aspects of the present disclosure. The example shown includes user interface 1700, upload element 1705, import element 1710, tone control element 1715, tone option 1720, prompt element 1725, and generate button 1730. For example, prompt element 1725 shows a user-specified prompt of "show salary and benefits in euros. The current conversion rate is 1.08 dollars to 1 euro". The prompt is then fed to a language generation model to change the currency in the slides deck.

User interface 1700 is an example of, or includes aspects of, the corresponding element described with reference to FIGS. 3, 7, 8, and 15. Upload element 1705 is an example of, or includes aspects of, the corresponding element described with reference to FIGS. 3 and 15. Import element 1710 is an example of, or includes aspects of, the corresponding element described with reference to FIGS. 3 and 15. Tone control element 1715 is an example of, or includes aspects of, the corresponding element described with reference to FIGS. 3 and 15. Tone option 1720 is an example of, or includes aspects of, the corresponding element described with reference to FIGS. 3 and 15. Prompt element 1725 is an example of, or includes aspects of, the corresponding element described with reference to FIGS. 3 and 15. Generate button 1730 is an example of, or includes aspects of, the corresponding element described with reference to FIGS. 3 and 15.

Figure 18:
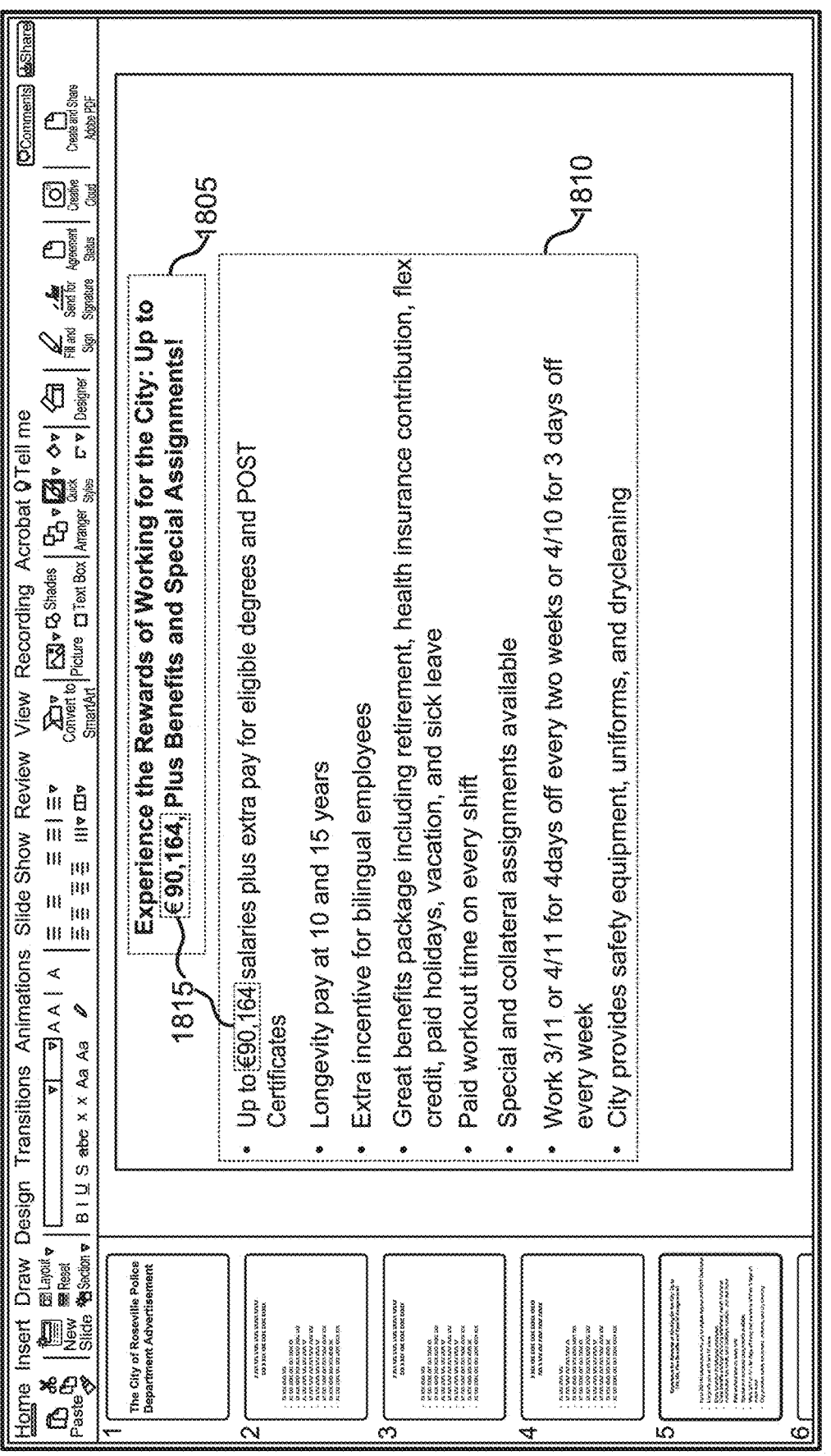
FIG. 18 shows an example of a presentation slide of an output document according to aspects of the present disclosure.

FIG. 18 shows an example of a presentation slide of an output document 1800 according to aspects of the present disclosure. The example shown includes output document 1800, output heading 1805, output section 1810, and target text 1815. Output document 1800 includes output heading 1805 and output section 1810. Referring to FIGS. 5 and 17-18, target text 1815 is modified based on the prompt. In FIG. 5, salary and benefits are displayed in dollars. In FIG. 18, salary and benefits are displayed in euros. Iterative editing enables increased and fine-grained control over the generated output. In this example, the salary is changed from dollars to euros by providing the appropriate conversion rate (e.g., providing the conversion rate as a prompt to a transformer-based machine learning model).

Output document 1800 is an example of, or includes aspects of, the corresponding element described with reference to FIGS. 4, 5, and 16. Output heading 1805 is an example of, or includes aspects of, the corresponding element described with reference to FIGS. 4, 5, 14, and 16. Output section 1810 is an example of, or includes aspects of, the corresponding element described with reference to FIGS. 4, 5, 14, and 16.

FIG. 19 shows an example of a computing device 1900 according to aspects of the present disclosure. The example shown includes computing device 1900, processor(s) 1905, memory subsystem 1910, communication interface 1915, I/O interface 1920, user interface component(s) 1925, and channel 1930. In one embodiment, computing device 1900 includes processor(s) 1905, memory subsystem 1910, communication interface 1915, I/O interface 1920, user interface component(s) 1925, and channel 1930.

In some embodiments, computing device 1900 is an example of, or includes aspects of, document processing apparatus 110 of FIG. 1. In some embodiments, computing device 1900 includes one or more processors 1905 that can execute instructions stored in memory subsystem 1910 to extract structured text from a source document, wherein the structured text comprises a plurality of source sections; generate, using a language generation model, a semantic outline based on the structured text, wherein the semantic outline comprises a plurality of output headings; and generate an output document based on the semantic outline, wherein the output document comprises a plurality of output sections corresponding to the plurality of output headings, respectively.

According to some embodiments, computing device 1900 includes one or more processors 1905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1915 operates at a boundary between communicating entities (such as computing device 1900, one or more user devices, a cloud, and one or more databases) and channel 1930 and can record and process communications. In some cases, communication interface 1915 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1920 is controlled by an I/O controller to manage input and output signals for computing device 1900. In some cases, I/O interface 1920 manages peripherals not integrated into computing device 1900. In some cases, I/O interface 1920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1920 or via hardware components controlled by the I/O controller.

According to some embodiments, user interface component(s) 1925 enable a user to interact with computing device 1900. In some cases, user interface component(s) 1925 include an audio device, such as an external speaker system, an external display device such as a display screen, an input device (e.g., a remote control device interfaced with a user interface directly or through the I/O controller), or a combination thereof. In some cases, user interface component(s) 1925 include a GUI.

Performance of apparatus, systems and methods of the present disclosure have been evaluated, and results indicate embodiments of the present disclosure have obtained increased performance over existing technology. Example experiments demonstrate that the document processing apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   extracting structured text from a source document, wherein the structured text comprises a plurality of source sections;
   generating, using a language generation model comprising a transformer model, a semantic outline based on the structured text by performing a self-attention mechanism that combines information from the structured text with an input prompt, wherein the input prompt comprises instructions to a plurality of output headings for the semantic outline from the plurality of source sections, and wherein the self-attention mechanism is performed by an encoder or a decoder of the transformer model;
   generating, using the language generation model, text content corresponding to each of the plurality of output headings;
   selecting an image from the source document for each of the plurality of output headings by computing a similarity score between the image and the generated text content of a respective output heading of the plurality of output headings; and
   generating an output document based on the semantic outline, wherein the output document comprises the selected image, the text content, and a plurality of output sections corresponding to the plurality of output headings, respectively.

2. The method of claim 1, wherein
   the input prompt includes the instructions to generate the semantic outline to cover important sections of the plurality of source sections.

3. The method of claim 1, further comprising:
   extracting the image from the source document; and
   selecting the image to represent a heading of the plurality of output headings, wherein the output document includes the selected image in an output section corresponding to the heading.

4. The method of claim 1, further comprising:
   identifying a plurality of images from the source document and a pre-determined selection factor; and
   filtering the plurality of images based on the pre-determined selection factor to obtain a filtered set of images, wherein the filtered set of images includes the selected image.

5. The method of claim 1, wherein selecting the image comprises:
   generating a multi-modal text embedding based on the text content;
   generating a multi-modal image embedding based on the image; and
   computing the similarity score by comparing the multi-modal text embedding and the multi-modal image embedding.

6. The method of claim 1, further comprising:
   generating a synthesized image based on a heading of the plurality of output headings, wherein the output document includes the synthesized image in an output section corresponding to the heading.

7. The method of claim 1, wherein:
the semantic outline includes a plurality of sub-headings
for a heading of the plurality of output headings.

8. The method of claim 1, wherein:
a number of the plurality of source sections is greater than
a number of the plurality of output headings.

9. The method of claim 1, further comprising:
identifying a predetermined number of output headings in
the output document, wherein the semantic outline is
generated based on the predetermined number of output
headings.

10. The method of claim 1, wherein generating the output
document comprises:
obtaining a document template; and
inserting the plurality of output headings into the document template.

11. The method of claim 1, wherein:
the output document comprises a slide presentation
including a plurality of slides corresponding to the
plurality of output sections, respectively.

12. The method of claim 1, further comprising:
receiving user feedback on the output document; and
updating the output document based on the user feedback.

13. An apparatus comprising:
at least one processor;
at least one memory including instructions executable by
the at least one processor;
an extraction component comprising parameters stored in
the at least one memory and configured to extract
structured text from a source document, wherein the
structured text comprises a plurality of source sections;
a language generation model comprising a transformer
model and including parameters stored in the at least
one memory, wherein the language generation model is
configured to generate a semantic outline based on the
structured text by performing a self-attention mechanism that combines information from the structured
text with an input prompt, wherein the input prompt
comprises instructions to select a plurality of output
headings for the semantic outline from the plurality of
source sections, wherein the self-attention mechanism
is performed by an encoder or a decoder of the transformer model, and wherein the language generation
model is configured to generate text content corresponding to each of the plurality of output headings;
an image selection component configured to select an
image from the source document for each of the
plurality of output headings by computing a similarity
score between the image and the generated text content
of a respective output heading of the plurality of output
headings; and
a document generator comprising parameters stored in the
at least one memory and configured to generate an
output document based on the semantic outline,
wherein the output document comprises the text content and a plurality of output sections corresponding to
the plurality of output headings, respectively.

14. The apparatus of claim 13, wherein:
the image selection component selects the image to represent a heading of the plurality of output headings,
wherein the output document includes the selected
image in an output section corresponding to the heading.

15. The apparatus of claim 13, further comprising:
an image generator configured to generate a synthesized
image based on a heading of the plurality of output
headings, wherein the output document includes the
synthesized image in an output section corresponding
to the heading.

16. The apparatus of claim 13, further comprising:
a user interface configured to receive user feedback on the
output document.

17. A non-transitory computer readable medium storing
code for natural language processing, the code comprising
instructions executable by at least one processor to:
extracting structured text from a source document,
wherein the structured text comprises a plurality of
source sections;
generating, using a language generation model comprising a transformer model, a semantic outline based on
the structured text by performing a self-attention
mechanism that combines information from the structured text with an input prompt, wherein the input
prompt comprises instructions to select a plurality of
output headings for the semantic outline from the
plurality of source sections, and wherein the self-
attention mechanism is performed by an encoder or a
decoder of the transformer model;
generating, using the language generation model, text
content corresponding to each of the plurality of output
headings;
selecting an image from the source document for each of
the plurality of output headings by computing a similarity score between the image and the generated text
content of a respective output heading of the plurality
of output headings; and
generating an output document based on the semantic
outline, wherein the output document comprises the
selected image, the text content, and a plurality of
output sections corresponding to the plurality of output
headings, respectively.

18. The non-transitory computer readable medium of
claim 17, wherein:
the input prompt includes the instructions to generate the
semantic outline to cover important sections of the
plurality of source sections.

19. The non-transitory computer readable medium of
claim 17, the code further comprising instructions executable by the at least one processor to:
identify a predetermined number of output headings in the
output document, wherein the semantic outline is generated based on the predetermined number of output
headings.

\* \* \* \* \*